United States Patent [19]

Zimmerman et al.

[11] Patent Number: 5,196,483
[45] Date of Patent: Mar. 23, 1993

[54] RUBBER COMPOSITIONS WITH A HIGH ELASTIC MODULUS

[75] Inventors: Daniel Zimmerman; John Milks; Sidney Binder; Roger J. Card, all of Stamford, Conn.; Winfried Wunderlich, Rossdorf; Werner Siol, Darmstadt, both of Fed. Rep. of Germany

[73] Assignee: American Cyanamid Company, Stamford, Conn.

[21] Appl. No.: 549,322

[22] Filed: Jul. 6, 1990

Related U.S. Application Data

[63] Continuation of Ser. No. 220,868, Jul. 18, 1988, abandoned.

[51] Int. Cl.$^5$ .............................................. C08F 265/04
[52] U.S. Cl. ...................................... 525/310; 525/309
[58] Field of Search ................................ 525/309, 310

[56] References Cited

U.S. PATENT DOCUMENTS

| | | | |
|---|---|---|---|
| 4,316,971 | 2/1982 | Rim et al. | 525/310 |
| 4,490,507 | 12/1984 | Abe et al. | 525/309 |
| 4,598,123 | 7/1986 | Cutter | 525/309 |

FOREIGN PATENT DOCUMENTS

| | | |
|---|---|---|
| 0014574 | 8/1980 | European Pat. Off. |
| 0015627 | 9/1980 | European Pat. Off. |
| 0033220 | 8/1981 | European Pat. Off. |
| 2050535 | 4/1971 | Fed. Rep. of Germany |
| 1494634 | 9/1967 | France |
| 47-02191 | 1/1972 | Japan ................... 525/309 |
| 0137041 | 10/1979 | Japan ................... 525/309 |
| 1286380 | 8/1972 | United Kingdom |

OTHER PUBLICATIONS

Japanese Abstract, JA-7202191-R, Jan. 1972.
Japanese Abstract, J54137-041, Oct. 1979.
Chemical Abstracts, vol. 84, No. 6, Feb. 1976, Reporting Japanese Kokai, 75, 111,138, apparently published, Sep. 1, 1975.

*Primary Examiner*—Melvyn I. Marquis
*Assistant Examiner*—Karen A. Dean
*Attorney, Agent, or Firm*—Frank M. Van Riet

[57] ABSTRACT

Modified rubber compositions comprise by weight about 15-60% of a highly saturated aliphatic rubber such as ethylene-propylene-diene rubber, about 25-80% of acrylate monomer units; and less than about 5% multi-functional monomer units. The compositions exist as amorphous heterogeneously dispersed phases. The first phase comprises the copolymer rubber to which polymers of at least 10% of the other monomer units are grafted. The second phase comprises the other monomers polymerized as homo and copolymers, not grafted to the rubber. Optionally, up to 20% of the composition comprises high index monomer units. The high index monomer units may be copolymerized with the acrylate and grafted to the rubber. Greater than 10% of the monomer units other than rubber are grafted to the rubber. The number average molecular weight of the grafts is between 10,000 and 80,000 daltons. About 2-20% by weight of one or more polymers may be provided to adjust the refractive indices of the rubber or the polyacrylate phase in the final product such that when the composition is present at the 10% rubber level, the haze can be reduced to less than 20%.

13 Claims, 10 Drawing Sheets

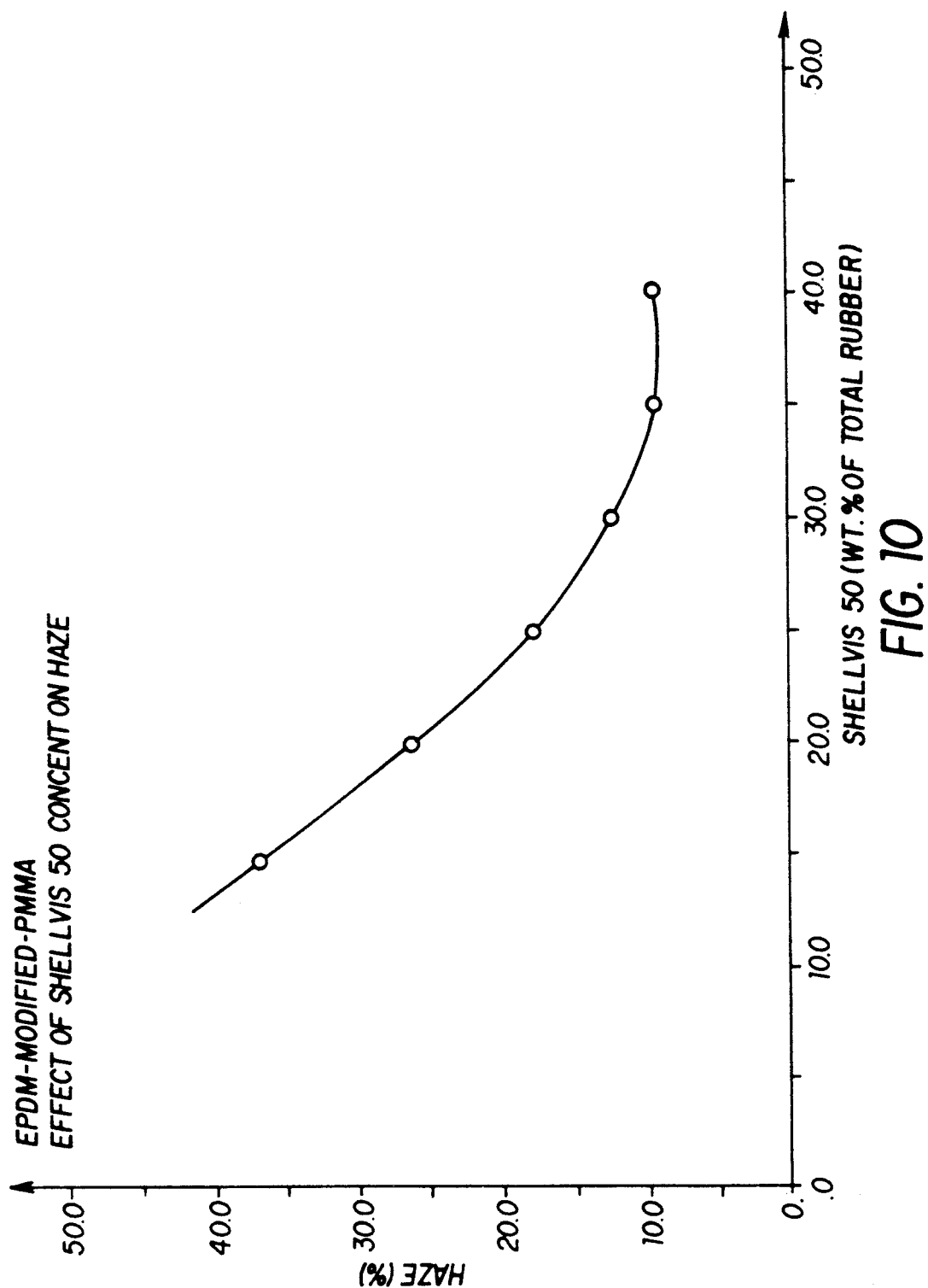

RUBBER COMPOSITIONS WITH A HIGH ELASTIC MODULUS

This application is a continuation of Ser. No. 07/220,868, filed Jul. 18, 1988, now abandoned.

TECHNICAL FIELD

This invention relates to reinforced polyacrylate products of high strength and, if desired, high clarity; and to methods of manufacturing such products. The invention further relates to the manufacture of modified rubber composition products providing such reinforcement when combined with acrylate monomers or polyacrylates during the manufacture of polyacrylate products.

BACKGROUND ART

It is well known that the addition of rubber particles to brittle plastics can result in increased impact resistance of the resulting rubber-brittle plastic blends relative to that of the unmodified brittle plastic It is, however, very difficult to design polymer blends which have good clarity and weatherability in addition to impact resistance. For example, butadiene rubber modified polymethylmethacrylate (PMMA) has better impact resistance than unmodified polymethylmethacrylate. But, the performance of such products rapidly declines on exposure to sunlight, even when stabilizers are added to minimize this degradation. Styreneacrylic modified PMMA, in contrast, exhibits better weatherability but poor cold temperature impact resistance.

The use of saturated rubbers, e.g. ethylene-propylene copolymers or hydrogenated polyisoprene, in place of butadiene rubber results in a product which is more stable in an outdoor environment. However, the high level of saturation of these rubbers, which results in improved weatherability, makes it very difficult to chemically modify the rubber. Controlled chemical modification of the rubber is essential in the development of a weatherable, impact resistant, high clarity rubber modified PMMA. This has not been accomplished until the present invention.

The high clarity and luster of polymethylmethacrylate are among the principal advantages of this polymer over many other commercial systems. There is a need for a toughened polymethylmethacrylate with good clarity and weatherability, for example, in the manufacture of exterior signs and decorative materials.

In the standard processes for the preparation of impact resistant brittle polymers, highly crosslinked, discreet rubbery particles are deliberately prepared prior to final processing This type of process suffers from two major drawbacks. First, relatively high levels of rubber are required for substantial impact performance, i.e., there is relatively low rubber efficiency. Second, the rubber particles can be adversely affected during processing, further lowering the rubber efficiency. It would be advantageous if the formation of discrete particles could occur much later in the process.

It would also be advantageous if a concentrated rubber containing composition could be prepared and stored. This material could be blended with pure polyacrylate to form finished products where and when desired. This would result in savings in shipping, handling and storage costs.

DISCLOSURE OF THE INVENTION

Our invention comprises forming a modified rubber composition, preferably in solid form, from an aliphatic, highly saturated rubber such as ethylenepropylenediene This composition when blended with acrylate monomer or polyacrylates such as polymethylmethacrylate (PMMA) and further processed produces impact resistant weatherable products High clarity can also be obtained when desired.

We polymerized rubber and acrylates to form two amorphous, heterogeneously dispersed phases—one comprising at least 10% and preferably at least 20% polyacrylates grafted to the rubber, the other comprising ungrafted, polymerized homo and copolymer acrylates. The number average molecular weight of the grafts range from 10,000 to 80,000 daltons. These compositions provide strong impact resistant and weatherable rubber PMMA blends.

We modify the index of refraction of one or both of the phases by including therein a polymer which modifies the index of refraction of that phase such that when the composition is added at the 10% EPDM level to a polyacrylate product, the product has a haze of less than 20%. Polymers added to the rubber phase have an index of refraction greater than that of the rubber and preferably greater than that of the polyacrylate Polymers added to the acrylate phase have an index of refraction less than that of the unmodified polyacrylate product and preferably less than that of the rubber.

The high index polymer added to the rubber phase preferably has an index of refraction greater than that of the unmodified polyacrylate product. Thus, it may comprise certain halogen containing polymers and other heteroatom containing species, but preferably it comprises phenyl groups, most preferably styrene. The high index polymer may be grafted to the rubber alone or with acrylates attached to form a copolymer graft; or the high index groups may be the high index block or blocks of a block copolymer comprising at least one other block of a saturated aliphatic polymer such as polyisoprene which is compatible with the highly saturated rubber phase. Both high index grafts and high index block copolymers may be employed in the same compositions. The block copolymer is preferably added to the modified rubber composition, but it may be added to the acrylates used to make the final PMMA product.

The low index polymer added to the acrylate phase is compatible with it and has an index of refraction less than that of the unmodified polyacrylate product and preferably less than that of the rubber. Thus, it may comprise monomer units comprising fluorine, preferably vinylidene fluoride. This polymer is preferably added to the acrylate used to make the final PMMA product, but may also be added to the modified rubber composition.

The compositions are manufactured by polymerizing a solution, apart from solvent, of by weight about 15-60%, preferably at least 20% and up to 50%, rubber, less than about 20% high index providing monomers, about 25-80% preferably at least 40% and up to 75%, acrylate monomers and up-to 5%, preferably from 0.1% to 2% of multifunctional monomers to which may be added a high index monomer unit possessing polymer, to bring the total proportion of said high index monomer units in the composition up to as much as about 20%. The modified rubber composition may be stored, preferably as a dry particulate, in containers and shipped to the place of manufacture of the polyacrylate product, where it is combined with greater than 20% of acrylate or polyacrylate to form such products. As indicated above, the high index block copolymers and low index polymers may be incorporated with the modified rubber product or added along with the modified rubber product to the polyacrylate in manufacturing polyacrylate products.

In the preferred process for manufacturing the modified rubber composition, ethylene-propylenediene rubber is combined with styrene monomer and acrylate monomers to form a grafted ethylene-propylenediene rubber intermediate. Thereafter, additional acrylate monomers, the index affecting monomers, if used, and optionally, a multifunctional monomer are added to the intermediate to form the final modified rubber composition. Preferably the product is dried, stored, and shipped to the place of manufacture bf the reinforced polyacrylate product. However, the entire process can take place at one time, in one place, in which case the intermediate need not be dried but can be combined in liquid form with polymethacrylate or acrylate monomers.

We have been surprised to find that our modified rubber composition does not contain discrete rubber particles but exists in two amorphous, heterogeneously dispersed phases. These phases are not inverted; that is, the rubber phase is not in the form of discrete small particles. This is a distinct advantage. Processing and blending conditions can be optimized to create the desired rubber particles near the very end of the overall process when the composition is blended to reinforce the polyacrylate product, resulting in much higher rubber efficiency. Also, the performance of final PMMA product is much less sensitive to shear history than prior rubber reinforced polyacrylates. Nonetheless, our process is sufficiently general so that discreet, crosslinked rubber particles may be generated, for example, by the addition of crosslinking agents during the grafting process, if desired.

Preferably, the final polymethylmethacrylate product of the invention contains 2 to 20% by weight rubber. Performance is sensitive to the rubber level. A product containing about 10% rubber may exhibit a notched Izod impact strength greater than 1.2 ft. lbs/in. measured according to American Society of Testing Materials (ASTM) standard #D-256 using a 0.25 inch test specimen, a Gardner strength (a modified procedure based on ASTM standard #D-3029) greater than 0.4 in lbs/mil thickness, and a Z-Haze (by ASTM standard #D-1003) less than 12%.

OBJECTS OF THE INVENTION

It is therefore among the objects of the invention to provide polyacrylate products with improved strength, clarity and weatherability, to increase processing flexibility and to reduce the shipping costs involved in the manufacture of rubber reinforced polyacrylate products.

Others objects of the invention will in part be obvious and will in part appear hereinafter. The invention accordingly comprises products, compositions of matter, and methods all possessing features, properties, ingredients, and characteristics, and the several steps and the relation of one or more of such steps with respect to each of the others, which will be exemplified in the products, compositions and methods hereinafter disclosed. The scope of the invention will be indicated in the claims.

For a further understanding of the nature and objects of the invention, reference should be had to the following detailed description.

DESCRIPTION OF THE DRAWINGS

For a fuller understanding of the nature and objects of the invention reference should be had to the following detailed description taken in connection with the accompanying drawings in which:

FIG. 10 is a graph of haze versus SHELLVIS ® 50 concentration of PMMA products reinforced with a fourth composition according to the invention.

The same reference characters refer to the same elements throughout the several views of the drawings.

BEST MODE FOR CARRYING OUT THE INVENTION

Figure 1:
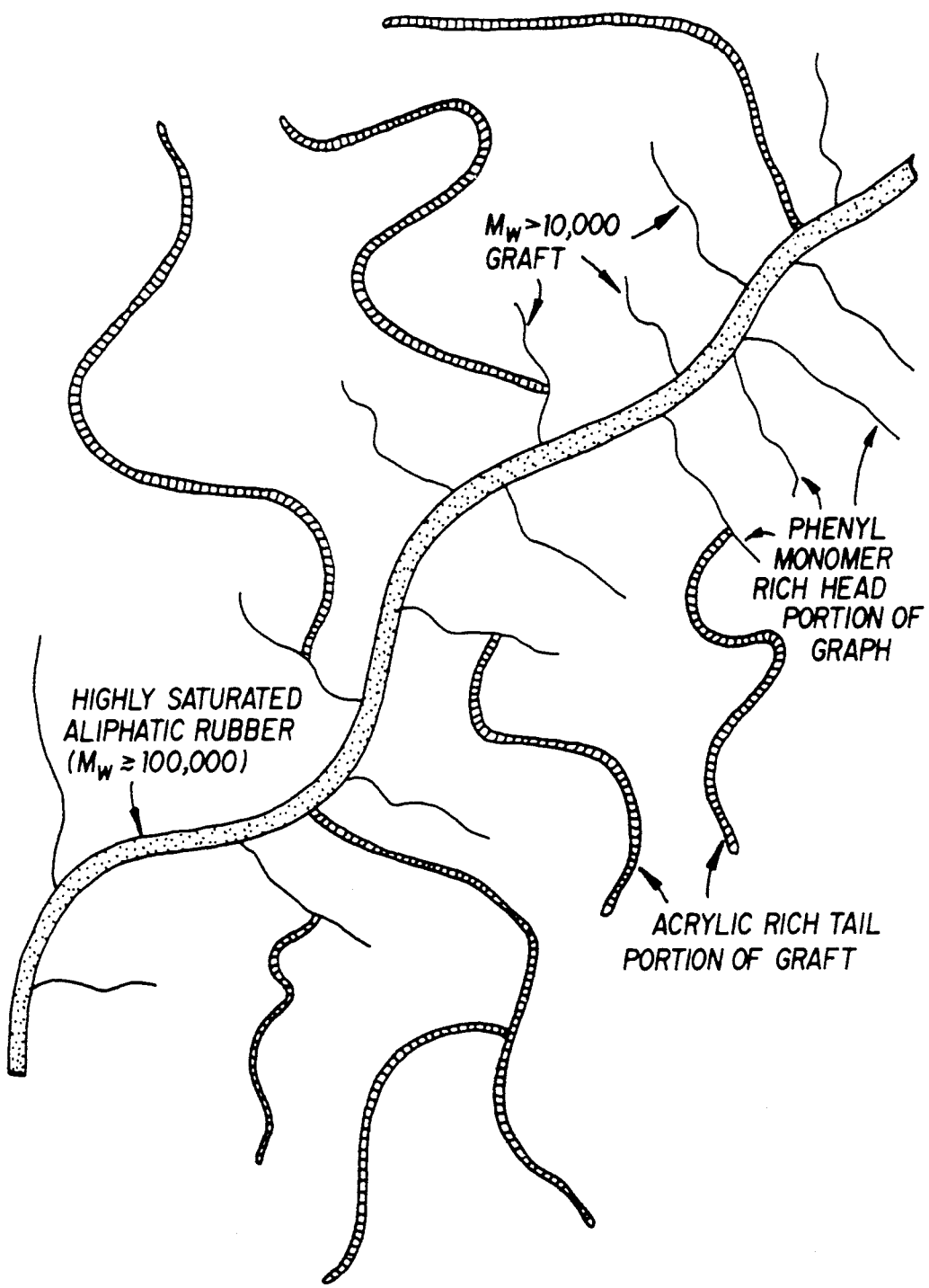
FIG. 1 is a partial schematic diagram of a single modified rubber chain according to the invention.
Figure 2:
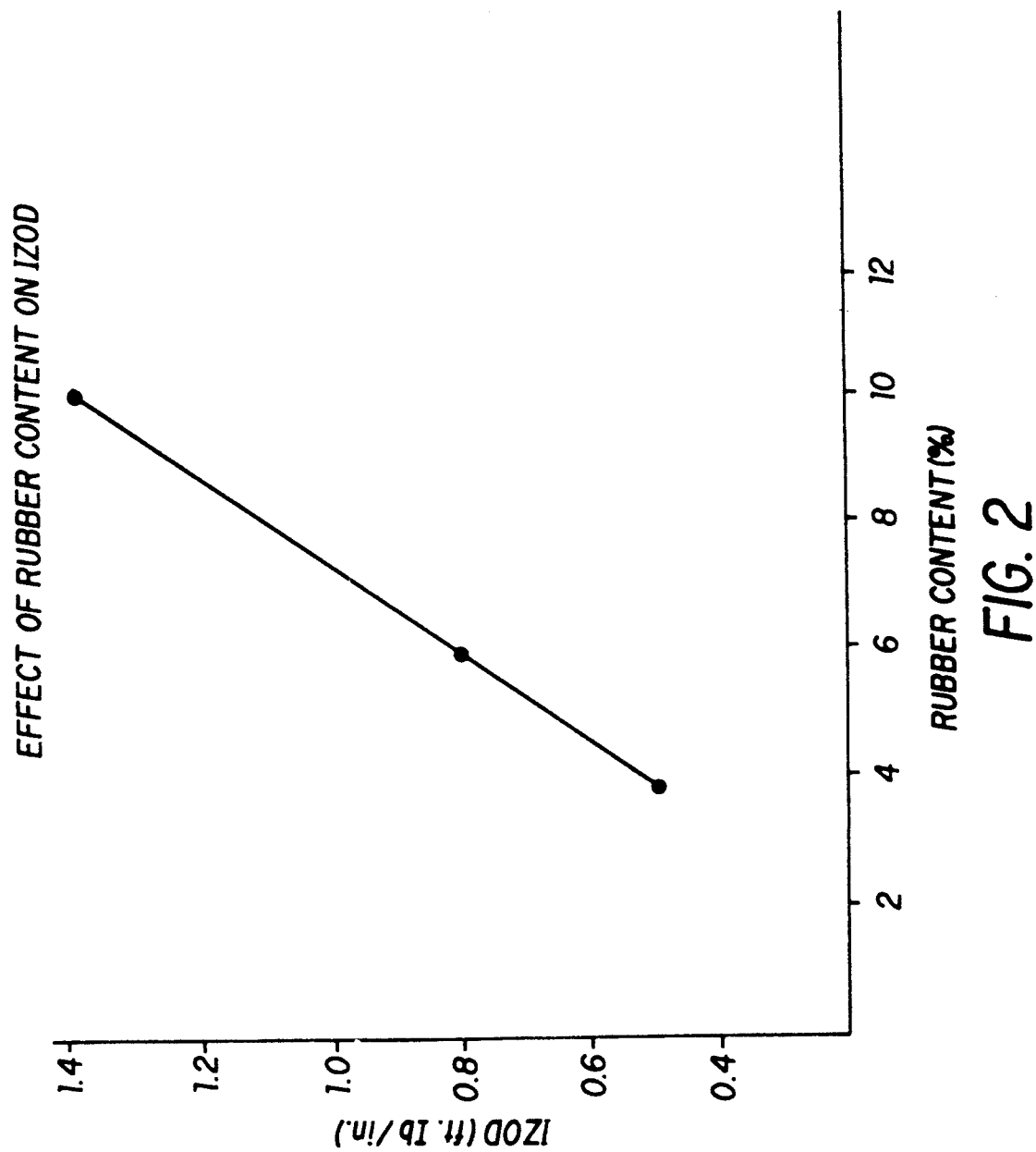
FIG. 2 is a graph of a notched Izod versus rubber content of polymethylmethacrylate products reinforced with a modified rubber composition of the invention.
Figure 3:
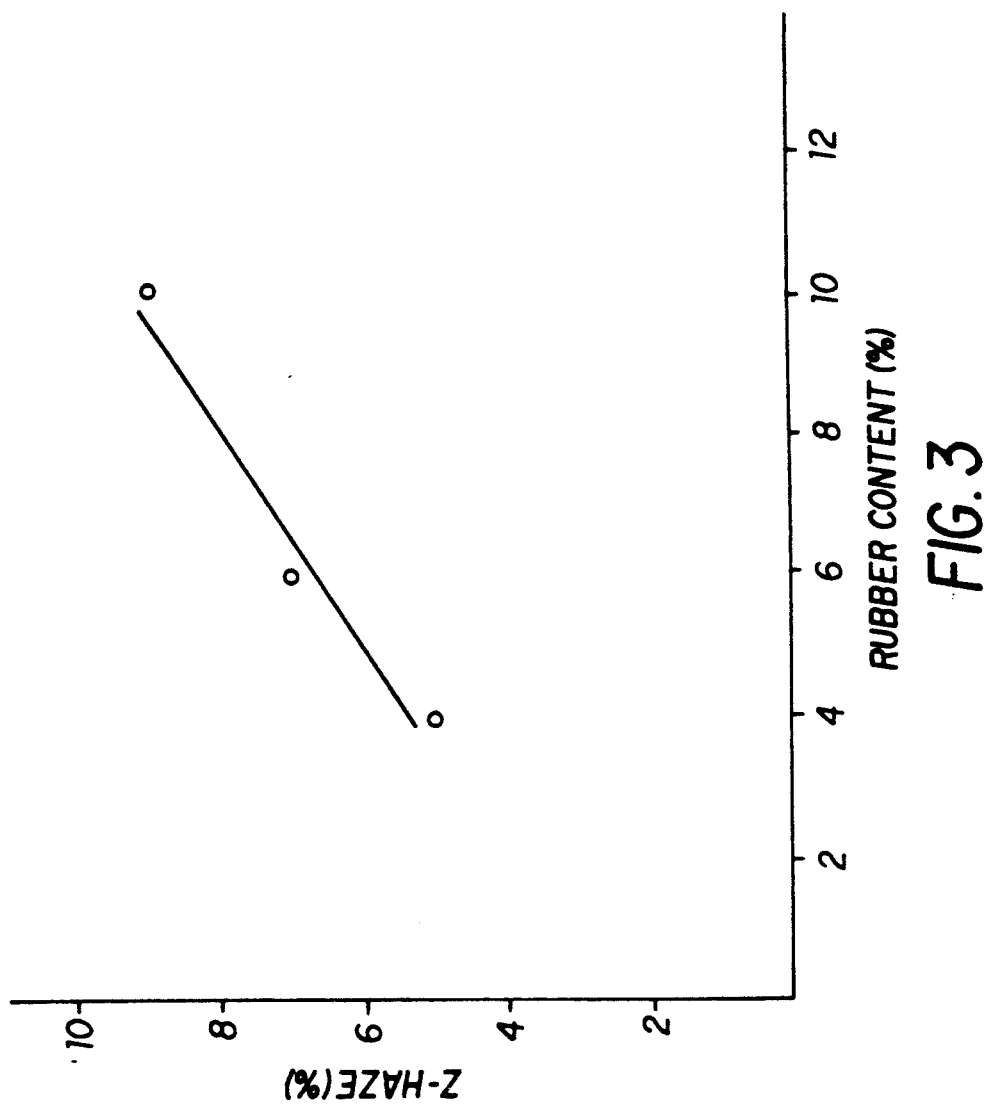
FIG. 3 is a graph of Z-haze versus rubber content of the above PMMA products.
Figure 4:
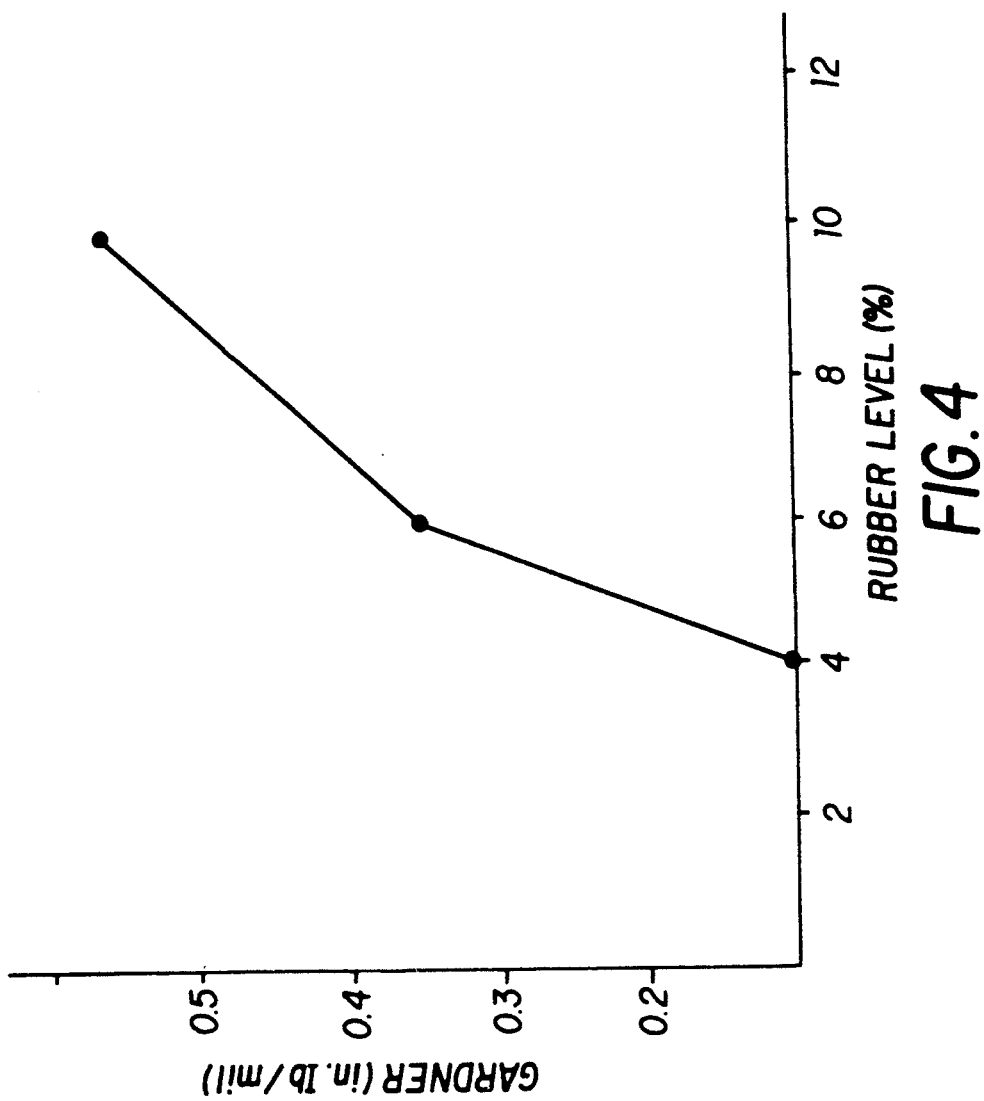
FIG. 4 is a graph of Gardner versus rubber content of the above PMMA products.
Figure 5:
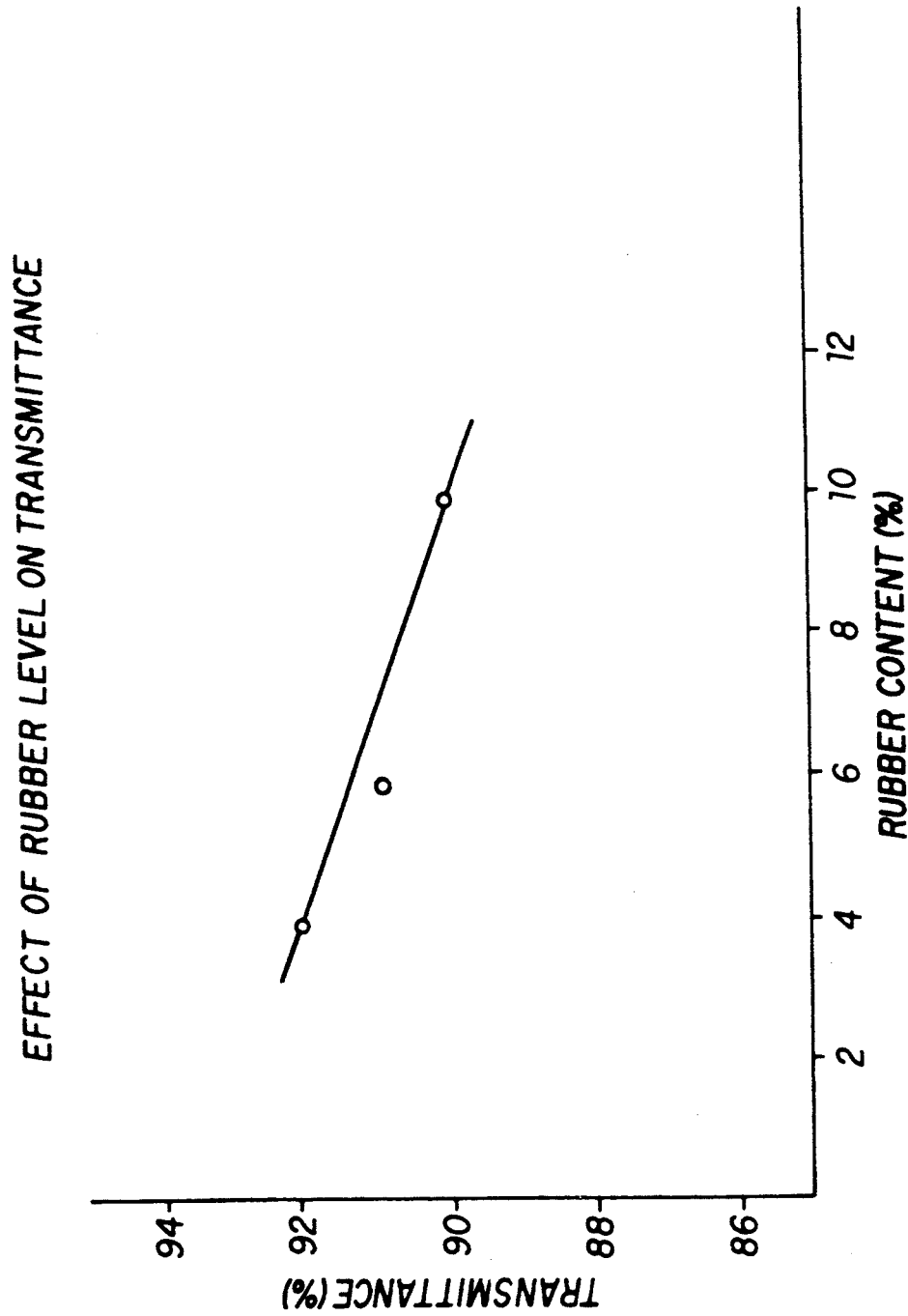
FIG. 5 is a graph of transmittance versus rubber content of the above PMMA products.

The present invention relates to modified rubber compositions which can be used to produce weatherable, impact resistant polyacrylate blends which may also have high clarity.

The novel, modified rubber compositions are produced by a) dissolving an aliphatic rubber containing a low level of unsaturation (i.e. a highly saturated rubber) in an organic solvent, b) grafting onto said rubber a mixture mainly of acrylate monomers but also optionally including one or more monomers having, when polymerized, a higher refractive index than rubber and preferably higher than PMMA and c) drying said modified rubber system. Optionally one or more polymers are added to the two phase system which modify the index of refraction of the phase of the composition they are compatible with to bring it closer to that of the other phase in the final product.

Rubbers

The aliphatic rubbers which can be used include materials bearing a highly saturated main chain (i.e. with less than 1%, preferably less than 0.1%, carbon-carbon double bonds in the main chain) and having side chains containing more than 0.1% carbon-carbon double bonds. Examples of such aliphatic rubbers are ethylene-propylene-diene rubbers (EPDM) ethylene-propylene-triene rubbers (EPTM), vinyl groups containing polysiloxanes, and the like. Preferred are materials such as Copolymer Rubber and Chemical Corporation's Epsyn ® family of ethylene-propylene-diene rubbers and Polysar, ethylene-propylene-diene rubbers from Polysar, Ltd. These preferred rubbers are copolymers containing mainly ethylene and propylene monomer units and small amounts of norbornene-containing monomer units. In this patent, the term "copolymer" refers to any polymeric material containing more than one kind of monomer unit. The norbornene monomer contains an olefinic moeity which remains intact in the ethylene-propylene-diene rubber. The olefin content and thus the level of unsaturation is controlled by the level of norbornene monomer in the copolymer rubber. The level of unsaturation desired according to this invention is from about 2 to about 30 olefinic groups per 1000 carbon atoms. More preferred is a level of unsaturation of about 5 to about 15 olefinic groups per 1000 carbon atoms.

Epsyn, 55 is one example of a commercial material which meets these requirements and works well in this invention. Other aliphatic rubbers which contain low levels of unsaturation that can be used in our invention include, but are not limited to, those supplied by Polysar Ltd. under the trademark Polysar ® These rubbers have a weight average molecular weight ($M_W$) greater than about 100,000.

Polymers for adjusting the refractive indices of rubber and polyacrylate phases There are two different groups of polymers which may be used for adjusting the refractive indices of the rubber and the polyacrylate phases. One group comprises monomer units having, when polymerized, a refractive index greater than 1.49 (the index of PMMA) and is compatible with the rubber. This group mainly comprises block copolymers or other copolymers containing, for example, phenyl groups that are grafted to the rubber. The other group comprises polymers that are incompatible with the rubber and compatible with the polyacrylate of the final product. This group mainly comprises polymers containing fluorine.

Block Copolymer

Block copolymers which are useful in this modified rubber composition contain at least one (1) block of a polymer such as polystyrene which has a refractive index greater than 1.49 at 25° C., and at least one (1) block of a polymer or copolymer such as hydrogenated polyisoprene which is compatible with the highly saturated rubber. The high refractive index block maybe a homopolymer or copolymer of monomers such as styrene, alpha-methyl-styrene, p-bromostyrene, p-methylstyrene, phenyl propyl methacrylate, phenyl ethyl methacrylate and the like Others include divinyl acetylene and the like. Polystyrene is preferred.

The rubber-compatible block or blocks generally are comprised of low molecular weight saturated monomer units such as ethylene, propylene and butylene. This block should be highly saturated and fully compatible with the ethylenepropylene monomer based rubber.

The block copolymer can be comprised of more than two blocks of these materials.

A number of these materials are commercially available. Useful materials include, but are not limited to, Shell Oil Company's Kraton ® 1701, Kraton ® 1650, and Shellvis ® 50.

The block copolymers while preferably added to the modified rubber composition could be added separately to the final PMMA product.

Fluorine containing polymers

The fluorine containing polymers which are useful for adjusting the refractive index of the polyacrylate phase are primarily polymers or copolymers of vinylidene fluoride, e.g. polyvinylidene fluoride or copolymers of vinylidenefluoride and hexafluoroacetone.

These polymers are preferably added to the final PMMA product. However they may be added to the modified rubber composition, generally in amounts of 1-20% by weight, preferably in amounts of 3 to 15% by weight.

Solvents

Organic solvents that may be used in the invention include materials with low solubility parameters such as benzene, toluene, xylenes, ethylbenzene, chlorobenzene, butylacetate, and the like. Preferred solvents are toluene, chlorobenzene and butylacetate. The solution according to the invention may contain about 10 to about 25 weight percent rubber, preferably from about 5 to about 35% rubber, more preferably about 10 to about 25% rubber.

Grafting

"Grafting" refers to the process of polymerizing one or more monomers in the presence of a polymer or copolymer under conditions where the product is expected to contain branches of the new polymer or copolymer attached to the carbon skeleton of the initial polymer or copolymer. The products obtained from a grafting process are complex mixtures containing oligomers, polymers or copolymers of the monomers, unreacted monomers, unchanged polymer or copolymer and grafted polymer or copolymer.

In a typical grafting reaction a mixture of a free radical initiator, the desired monomer or monomers and, optionally, an organic solvent is added to the solution of, for example, an aliphatic rubber polymer, under controlled conditions. The temperature is maintained high enough to cause decomposition of the free radical initiator into free radicals which then initiate grafting and polymerization of the monomers.

In order to obtain maximum performance, it is essential to carefully control the grafting process.

First, it is important that the monomers actually become chemically bonded to the rubber, i.e. that relatively high grafting efficiency be obtained. This is especially challenging when saturated rubbers are used. Since the grafting is always carried out in the presence of monomers and initiator, formation of copolymers which are not grafted to the rubber is always a competing process. These nongrafted homo and copolymers are generally not removed from the product and can actually reduce the clarity and impact resistance of the final rubber modified PMMA products. In this process, grafting efficiency should exceed about 10%, preferably 20% and most preferred 30%.

Second, the number average molecular weight ($M_N$) of the grafted chains and the ungrafted copolymers must be relatively high—greater than about 10,000 g/mole, preferably greater than 20,000 g/mole and most preferred close to 40,000 g/mole.

We have not found it necessary to go to very high molecular weights, e.g. greater than 80,000 g/mole.

The determination of the molecular weight of chains grafted onto rubber is based on the assumption that grafted chains and ungrafted chains formed separately by the same process have approximately the same molecular weight.

Third, to allow uniform mixing of the modified rubber composition with PMMA, the amount of crosslinking must be kept low. In contrast to a variety of other processes in which highly crosslinked rubber particles are used to stabilize brittle polymers, our modified rubber composition does not appear to contain discrete rubber particles until after it has been blended with PMMA. Rather, it comprises two amorphous, heterogeneously dispersed phases. This provides a distinct advantage for this composition since it is not necessary to create discrete stable particles in the initial process. Rather, processing and blending conditions can be optimized to create the desired particles when the modified rubber composition is blended with PMMA.

Our process is sufficiently general so that discreet, crosslinked rubber particles may be generated, for example, by the addition of crosslinking agents during the grafting process, if desired Addition of crosslinking agents is particularly preferred when EPDM dispersions have been generated (c.f. examples).

Fourth, while not wishing to be bound by theory, it appears that each monomer plays a specific role in determining the product performance. For example referring to FIG. 1, to be most effective in controlling the refractive index of the rubber phase, we have found that the high refractive index, phenyl containing polymer chains should be concentrated in that portion of the graft closest to the highly saturated rubber backbone 2, i.e. in the head portion 4 of the graft. Of course, if refractive index matching by grafting is not desired, or if block copolymer is to be used for index matching, the phenyl may be omitted. In order to increase the compatibility of the rubber particles with the PMMA matrix in the finished product, the grafted acrylate polymer 6 should be concentrated at the ends of the graft chains.

Thus, it is necessary to develop a product which has a high grafting efficiency, relatively high molecular weight graft chains (10,000 to 80,000 daltons), a low level of crosslinking (if any) and a controlled chemical composition in which the high refractive index monomer units are concentrated at the head end of the graft chains attached to the highly saturated rubber backbone. This is illustrated in FIG. 1.

Monomers Providing Phenyl Groups

For the grafting onto the rubber, a variety of monomers can be used which have a refractive index greater than that of polymethylmethacrylate. Conceptually, grafting a monomer with a high refractive index onto the low refractive index rubber creates a new copolymer which will have a refractive index much closer to the refractive index of polymethylmethacrylate (1.49 at 25° C.). Proper matching of the refractive index of two materials is known to be an important aspect in the ability to blend the two materials to obtain a mixture which has high clarity. While allowing proper matching of the refractive index of the grafted rubber with that of polymethylmethacrylate is one purpose of the grafting procedure, it is not necessarily the only purpose.

Monomers providing phenyl groups which can be used include but are not limited to styrene, meta- and para-methyl styrene, parabromovinylbenzene, phenylpropylmethacrylate, phenylethylmethacrylate, and the like. Styrene is the preferred monomer. The quantity of monomer added can range between about 10 to about 75 parts per hundred parts of rubber. The preferred quantity of phenyl containing monomer is in the range of about 20 to about 50 parts per hundred of rubber. Methylmethacrylate and other acrylate monomers may also be present during this process.

A number of non-phenyl-containing monomers can also be used to increase the refractive index of the rubber phase. These include halogen containing monomers such as 2-chloropropenal, 2 chloro-2-butenal, dibromoacetylene, and the like, as well as other heteroatom containing species such as acrylonitrile. These monomers can be used in the process of the invention. In general, the phenyl containing monomers have higher refractive indices than the heteroatom monomers allowing them to be more effective at lower levels of concentration. In addition, the phenyl group is more nearly inert than many of the heteroatoms and results in more stable products. Thus, while other high refractive index monomers can be used, phenyl containing monomers are preferred and the product is generically referred to as the phenyl graft.

We have found that the amount of monomers providing phenyl groups does not meet the theoretically expected value e.g. 8.5% styrene refractive index, ($n_D$=1.591 for polystyrene) to match the refractive index of EPDM (e.g. EPSYN ® 55$n^D$=1.484) in relation to PMMA ($n_D$=1.491). Instead, 50–600% in excess of the calculated amount of monomers providing phenyl groups is needed to provide proper matching (in the case of the above example, not the 8.5% expected but 20–50% of styrene has to be employed).

Much of the added phenyl contain monomer units must be going into species which do not assist refractive index matching and in fact compete against index matching Considering the great diversity of species formed, it is surprising that refractive index matching can be achieved.

The free radical initiator can be selected from the wide variety of commercially available non-azo initiators which are well known in the art. Preferred initiators include peroxy compounds, e.g. benzoyl peroxide, cumyl peroxide, di-t-butyl peroxide, t-butyl peroctoate, and the like.

The concentration of initiator can range between about 0.1 to about 5 parts per hundred parts of rubber. The preferred concentration is between about 0.5 to about 2.5 parts per hundred rubber. The solvent is selected from the group already described and is usually identical to the solvent in which the rubber has been dissolved. No solvent is necessary. When a solvent is used for processing considerations, it is used in quantities ranging between about 100 and about 2000 parts per hundred rubber, preferably over the range of about 100 to about 750 parts per hundred rubber.

Grafting Step

The mixture of monomers, initiator and solvent is added to a heated, agitated solution of the rubber and optionally, the fluorine containing polymer or the block copolymer, or both. The grafting is carried out at a temperature which is at least sufficient to convert the initiator into free radicals. Useful temperatures range between about 50° and about 200° C., preferably from about 65° to about 130° C. The solution of rubber and added monomer can be agitated by any convenient means which allows thorough mixing throughout the addition of the monomers, and, preferably throughout the reaction. The reaction is allowed to occur for sufficient time for the conversion of monomers to polymer to exceed about 50%, and preferably to exceed about 70%.

The product of this first grafting step, hereafter referred to as the "phenyl graft", can be isolated and dried but is preferably used without modification in the acrylate grafting step.

The acrylate monomers grafting step is performed in a manner similar to that of the phenyl grafting procedure. A solution of the desired monomers, a free radical initiator and, optionally, a solvent is added to the phenyl graft solution under conditions which are expected to produce some grafting.

The monomers are selected to make the graft polymer compatible with the bulk polyacrylates with which the modified rubber composition will be blended. The monomers are of the same general family as the final polyacrylate products:

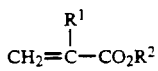

where $R^1$ is H or an alkyl or aryl group containing less than about 9 carbon atoms and $R^2$ is an alkyl or aryl group containing less than about 9 carbon atoms. Aliphatic groups containing less than 4 carbon atoms are preferred. The monomers can be used alone or in mixtures.

The acrylates are selected such that the dynamic glass transition temperature, $T_{max}$, of a homo- or copolymer consisting of said acrylates should be in the range of from 50° C. to 170° C. Preferably, 70–100% by weight, more preferably 80 to 99% by weight, of the total monomers is methylmethacrylate.

The free radical initiator can be chosen from those known in the art to (a) catalyze the polymerization of methylmethacrylate, and also (b) abstract hydrogen from highly saturated rubbers to initiate grafting. Preferred initiators are peroxy compounds including, but not limited to, benzoyl peroxide, di-t-butyl peroxide, cumyl peroxide, t-butylperoctoate, and the like.

The solvent meets the criteria described above. No solvent is necessary. When a solvent is used for processing reasons, it is used in quantities ranging from about 100 to about 2000 parts per hundred rubber, preferably about 100 to about 750 parts per hundred rubber.

The useful temperature range is between about 50° and about 200° C. preferably between about 65° and about 130° C. The solution can be agitated by any convenient means which allows thorough mixing throughout the period of addition of the monomers to the phenyl graft. The reaction is allowed to proceed until the conversion exceeds about 50%, and, preferably exceeds about 70%.

This grafting procedure may be carried out in one step or in a series of steps, for example, to incorporate different levels of methylacrylate in a series of grafting steps.

A multifunctional monomer may be added at a low level at any step in the process to increase graft molecular weight with minimal crosslinking the graft network. Typical multifunctional monomers include divinyl benzene, tris allyl isocyanurate, and the like.

The modified rubber product can then be dried in any convenient manner. One convenient lab process involves air drying the product for about 12 to about 24 hours followed by removal of any remaining solvent in vacuo. A preferred process involves continuous devolatilization in an extruder.

The process can be conducted as either a batch or a continuous system. The product is then stored and shipped to the place of manufacture of polyacrylate products.

The modified rubber composition is then blended with about 20% to 95% by weight of polyalkylacrylate comprising greater than about 90% of monomer units of the structure

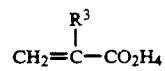

wherein $R^3$ is selected from the group consisting of H, an alkyl group, and $R^4$ is selected from the group consisting of an alkyl group, and an aryl group, said groups each comprising less than about 9 carbon atoms, in particular with polymethylmethacrylate, in any convenient process to yield a rubber modified polyalkyl acrylate product, especially a polymethylmethacrylate product which has at the 10% EPDM rubber level, a notched Izod greater than about 1.2 ft lbs/in, Gardner greater than about 0.4 in lb/mil, and Z-Haze less than about 12%.

When blending the rubber modified composition with greater than 20% by weight of polyacrylate, polymer which will adjust the refractive indices of rubber and polymethacrylate can be added.

Alternatively the modified rubber composition may be blended with acrylate monomer and polymerized to form modified rubber reinforced polyacrylate.

Of course, small amounts of various additives, including stabilizers, dyes, processing aids, pigments, etc., can be added at various stages in the process. Useful materials are well known to those knowledgeable in the art. We use combinations of various stabilizers including anti-oxidants, UV absorbers, and hindered amines as light stabilizers.

Modified Gardner Testing Procedure

A $20 \times 10^{-3}$ or $40 \times 10^{-3}$ inch thick sheet is subjected to a 2 pound drop weight from a given height. The value is obtained by raising the height of the fall until failure (i.e., a break in sheet) occurs and then decreasing the height until material passes and then raising the drop height again. After an approximate range is obtained, 30 readings are taken, averaged and divided by the thickness of the samples, thus obtaining a measurement in inch-pounds/mil.

EXAMPLE 1

The modified rubber particulate product is preferably manufactured as follows: 50 g (gram), 33 pphr (parts per hundred rubber) styrene (Sty); 60 g, 40 pphr methylmethacrylate (MMA); 1 g, 0.7 pphr methylacrylate (MA) and 2.4 g, 1.6 pphr benzoyl peroxide (B.P.) initiator (Init) are combined and placed in a graduated addition funnel. The solution is purged with nitrogen. One half of this solution is added in a slow stream over a 5-10 minute period to a stirred solution of 150 g ethylene-propylene-diene rubber (EPDM) such as Epsyn ® 55 rubber dissolved in 900 g toluene (Tol) at 75° C. under a nitrogen atmosphere. The remainder of the styrene containing solution is added dropwise to the stirred rubber solution over 2 hours. The resulting solution is stirred and maintained at 75° C. for an additional 14 hours. At this stage, at least 65% of the monomers have been grafted onto the rubber or converted to styrene methylmethacrylate copolymer.

216 g, 144 pphr methylmethacrylate; 5 g, 3 pphr methylacrylate and 2 g, 1.3 pphr benzoyl peroxide are added to a graduated addition funnel and purged with nitrogen. One half of this mixture is added in a slow stream over 5-10 minutes to the grafted rubber solution prepared above at 80° C. under a nitrogen atmosphere. The remainder of the methylmethacrylate solution is added dropwise over a 2 hour period to the stirred rubber solution. The resulting mixture is allowed to stand for 16 hours. Solvent and unreacted monomers are removed under reduced pressure.

The yield of modified EPDM product is 465 g indicating 95% conversion of monomers to grafted species or copolymers. The product may be produced and stored indefinitely and shipped to the place of manufacture of polymethylmethacrylate.

The product was blended with polymethylmethacrylate such as Acrylite ® H-12 supplied by CYRO Industries and processed to yield a composite containing 10% ethylenepropylene-diene rubber which exhibited the following properties: Z-Haze=7%; Notched Izod=1.8 ft lb/in; Gardner Impact=0.62 in lbs/mil for a 40 mil sheet; Yellow Index=5; and transmittance=90%.

EXAMPLE 2

The modified ethylene-propylene-diene rubber, polymethylmethacrylate composite product at the 10% rubber level was prepared as described in Example 1, except that monochlorobenzene (MCB) was substituted for toluene solvent throughout the procedure. The following properties were obtained: Z-Haze=10%, Notched Izod=1.7 ft lb/in; Yellow Index=7; and transmittance=91%.

EXAMPLE 3

In an alternative process, 50 g styrene; 2.6 g benzoyl peroxide; 60 g methylmethacrylate and 1 g methyl acrylate are placed in an addition funnel and purged with carbon dioxide. One half of this solution is added in a slow stream over a 5 minute period to a stirred solution of 150 g Epsyn ® 55 ethylene-propylene-diene rubber dissolved in 900 g toluene at 90° C. under a nitrogen atmosphere. The reminder of the styrene solution is added dropwise to the stirred rubber solution over 1 hour. The resulting mixture is stirred and maintained at 90° C. for 16 hours.

216 g methylmethacrylate, 5 g methyl acrylate and 2.0 g benzoyl peroxide are added to an addition funnel and purged with carbon dioxide. One half of this mixture is added over a period of 5 minutes to the stirred solution of rubberstyrene-methylmethacrylate product obtained above at 80° C. under a nitrogen atmosphere. The remainder of the solution is added dropwise over a period of 1 hour. The resulting mixture is allowed to stand at 80° C. for 16 hours.

The product is removed from the reactor, cut into small pieces and solvent is allowed to evaporate under ambient conditions for approximately 16 hours. The remaining solvent and volatile materials are removed under vacuum at approximated 100° C. The yield of the dried modified rubber particulate product is 433 g. Assuming complete product recovery, the conversion of styrene, methylmethacrylate and methyl acrylate monomers to polymers is 86% giving a calculated polymer to rubber ratio (P/R) of 1.90.

This product is then blended with Acrylite ® H-12 supplied by Cyro Industries polymethylmethacrylate and processed to yield test samples containing 10% rubber which are characterized by Z-Haze (8%), and Notched Izod (1.6 ft lb/in).

This example illustrates the preparation of the dried modified rubber composition via the phenyl graft process. It further illustrates that the grafting process can be carried out over a range of temperatures (90° C. vs 75° C. in Example 1).

EXAMPLES 4-12

Examples 4 to 12 were carried out in a manner identical to that of Example 1 except for the changes indicated in Table I. These examples demonstrate the broad range of conditions which can be used during the phenyl graft step. Specifically, either pure methylmethacrylate (MMA) or a mixture of MMA and methylacrylate (MA) can be used as the acrylate monomers (Examples 1, 4). A range of levels of MMA, total level of monomers to rubber and ratios of MMA to styrene can be used (Examples 1, 5, 6, 7). A range of temperatures (Examples 1, 8), initiator levels (Examples 1, 9, 10) and extent of conversion of monomers to graft and copolymers (Examples 1, 10, 11, 12) can yield product with good performance.

TABLE I

Examples 1, 2, 4-12

| Example No. | Phenyl Graft Conditions | | | | | | | | Performance | | |
|---|---|---|---|---|---|---|---|---|---|---|---|
| | Solvent | Init | Temp (°C.) | Reagent Level (PPHR) | | | | | Notched Izod ft lbs/in | Z-Haze (%) | Gardner (in lbs/mil) |
| | | | | Init | Sty | MMA | MA | P/R | | | |
| 1 | Tol | B.P. | 75 | 1.6 | 33 | 40 | .7 | .5 | 1.8 | 7 | 0.6 |
| 2 | MCB | B.P. | 75 | 1.6 | 33 | 40 | .7 | .5 | 1.7 | 10 | |
| 4 | Tol | B.P. | 75 | 1.6 | 33 | 41 | 0 | — | 1.7 | 11 | 0.4 |
| 5 | Tol | B.P. | 75 | 1.5 | 33 | 66 | 5 | — | 1.5 | 11 | |
| 6 | Tol | B.P. | 75 | 1.6 | 33 | 90 | 2 | — | 1.6 | 9 | 0.5 |
| 7 | Tol | B.P. | 75 | 1.6 | 33 | 143 | 3 | 1.1 | 1.5 | 9 | 0.6 |
| 8 | Tol | B.P. | 85 | 1.6 | 33 | 40 | .7 | .5 | 1.6 | 7 | 0.6 |
| 9 | Tol | B.P. | 75 | 2.0 | 33 | 40 | .7 | .5 | 1.6 | 9 | 0.6 |
| 10 | Tol | B.P. | 75 | .8 | 33 | 40 | .7 | .3 | 1.5 | 8 | 0.6 |
| 11 | Tol | B.P. | 75 | 1.6 | 33 | 115 | 2 | 1.1 | 1.4 | 9 | 0.7 |
| 12 | Tol | B.P. | 75 | 1.6 | 33 | 115 | 2 | .5 | 1.5 | 9 | 0.6 |

EXAMPLE 13

The modified rubber composition is manufactured as follows: 50 g, 33 pphr (parts per hundred rubber) styrene and 2.4 g, 1.6 pphr benzoyl peroxide are combined and placed in a graduated addition funnel. The solution is purged with nitrogen. One half of this solution is added in a slow stream over a 5-10 minute period to a stirred solution of 150 g ethylene-propylene-diene rubber (EPDM) such as Epsyn ® 55 rubber in 900 g toluene at 75° C. under a nitrogen atmosphere. The remainder of the styrene containing solution is added dropwise to the stirred rubber solution over 2 hours. The resulting solution is stirred and maintained at 75° C. for an additional 14 hours. This is followed by the acrylate monomers grafting step. 273 g (182 pphr) methylmethacrylate; 7.5 g (5 pphr) methylacrylate and 2.2 g (1.5 pphr) benzoyl peroxide were added to a graduated addition funnel and purged with nitrogen. One half of this mixture was added in a slow stream over 5-10 minutes to the grafted rubber solution prepared above at 75° C. under a nitrogen atmosphere. The remainder of the methylmethacrylate solution was added dropwise over a 2-hour period to the stirred rubber solution. The resulting mixture was allowed to stand for 16 hours. Solvent and unreacted monomers were removed under reduced pressure.

The yield of modified EPDM product was 465 g indicating 95% conversion of monomers to grafted species or copolymers. The product may be produced and stored indefinitely and shipped to the place of manufacture of polymethylmethacrylate.

The product (32%) was blended with polymethylmethacrylate (68%) such as Acrylite ® H-12 supplied by CYRO Industries and processed to yield a composite containing 10% ethylene-propylene-diene rubber. The process comprises blending in a Leistritz extruder to form pellets and then injection molding. The molded product exhibited the following properties: Z-Haze=11%; Notched Izod=1.7 ft lb/in; Gardner Impact=0.55 in lbs/mil for a 20-mil sheet; Yellow Index=5; and transmittance=91%.

Example 13 demonstrates that good performance can be obtained even if only the phenyl containing monomer is added during the first step.

EXAMPLES 14 and 15

Examples 14 and 15 were performed as described for Example 13 except for the changes summarized in Table II. These results demonstrate that a broad range of temperatures, initiators and initiator levels can be used in the acrylate monomer grafting step.

effect of rubber level on performance is presented in FIGS. 2 through 5.

Thus, the performance package can be modified, for example to optimize either optical clarity or toughness, by careful control of the rubber content in the finished product.

EXAMPLE 16

Example 16 was performed in a manner identical to Example 13 except that all the monomers were added in a 5 to 10 minute period at the start of each of the phenyl graft step and the acrylate monomers graft step. The PMMA product exhibited Z-Haze=11%; Notched Izod=1.5 ft lbs/in; and Gardner=0.6 in lbs/mil. This example demonstrates that the manner of addition of the monomers can be varied for convenient processing.

EXAMPLE 17

Example 17 was performed in a manner identical to Example 13 except that a 1:1 mixture by weight of benzoyl peroxide and t-butyl peroctoate was substituted for the pure benzoyl peroxide in the phenyl graft step. The final product exhibited Z-Haze=10%; Notched Izod=1.5 ft lbs/in; Gardner ±0.2 in lbs/mil.

This example demonstrates that mixtures of peroxide initiators can be used in the phenyl grafting step.

EXAMPLE 18

Example 18 was performed in a manner identical to Example 14 except that Vazo ® 67 azo initiator was substituted for the benzoyl peroxide initiator in the acrylate grafting step. The resulting product exhibited Z-Haze=44%; Notched Izod=0.4 ft lbs/in; Gardner less than 0.2 in lbs/mil.

This example demonstrates that azo initiators are not useful in this process.

EXAMPLE 19

The modified rubber composition is manufactured as follows: 50 g, 33 pphr styrene and 2.4 g, 1.6 pphr benzoyl peroxide are combined and placed in a graduated addition funnel. The solution is purged with nitrogen. One half of this solution is added in a slow stream over a 5-10 minute period to a stirred solution of 150 g ethylene-propylene-diene rubber (EPDM) such as Epsyn ® 55 rubber in 900 g toluene at 75° C. under a nitrogen atmosphere. The remainder of the styrene containing solution is added dropwise to the stirred rubber solution over 2 hours The resulting solution is stirred and maintained at 75° C. for an additional 14 hours. This is followed by two acrylate monomer grafting steps.

To the phenyl graft was added 45 g (30 pph) MMA,

TABLE II

| Examples 13-15 | | | | | | |
|---|---|---|---|---|---|---|
| Acrylate Monomers Grafting Conditions | | | | | | |
| | | | | Performance | | |
| Example No. | Temp (°C.) | Initiator | Initiator Level (PPHR) | Notched Izod | Z-Haze | Gardner |
| 13 | 75 | B.P. | 1.5 | 1.7 | 11 | 0.6 |
| 14 | 90 | B.P. | 1.0 | 1.5 | 9 | 0.6 |
| 15 | 110 | Di-t-butyl peroxide | 5.0 | 1.7 | 12 | 0.6 |

Effect of Rubber Level on Performance

A rubber modified composition was prepared as described in Example 13 and then diluted with PMMA to produce products with a variety of rubber levels. The 4.5 g (3pph) MA and 1.2 g (.8pph) benzoyl peroxide. The acrylate monomers were added dropwise to the stirred phenyl graft solution at 90° C. The solution was allowed to stand overnight.

195 g (130 pphr) methylmethacrylate; 4.5 g (3 pphr) methylacrylate and 1.5 g (1.0 pphr) benzoyl peroxide were added to a graduated addition funnel and purged with nitrogen. One half of this mixture was added in a slow stream over 5-10 minutes to the grafted rubber solution prepared above at 90° C. under a nitrogen atmosphere. The remainder of the methylmethacrylate solution was added dropwise over a 2-hour period to the stirred rubber solution. The resulting mixture was allowed to stand for 16 hours. Solvent and unreacted monomers were removed under reduced pressure.

The yield of modified EPDM product was 390 g indicating 80% conversion of monomers to grafted species or copolymers. The product may be produced and stored indefinitely and shipped to the place of manufacture of polymethylmethacrylate.

The product was blended with polymethylmethacrylate, Acrylite ® H-12, supplied by CYRO Industries and processed to yield a composite containing 10% ethylene-propylene-diene rubber which exhibited the following properties: Z-Haze=7%; Notched Izod=2.0 ft lb/in; Gardner Impact=0.56 in lbs/mil for a 20-mil sheet: Yellow Index=7; and transmittance=88%.

Effect of Variables on Styrene Graft

Modified rubber compositions were prepared according to Example 19 with the exception that specific reaction conditions were modified according to a factorial $2^{7-4}$ designed series of experiments. The variables chosen, the values of each variable used and the performance data obtained are presented in Table III.

TABLE III $2^{7-4}$ FACTORIAL DESIGN SERIES

| | | | VARIABLES | | | | PERFORMANCE | | | |
|---|---|---|---|---|---|---|---|---|---|---|
| Example | Solvent | Temp (°C.) | Catalyst | Initiator Concentration (PPH) | Styrene Addition Profile | Styrene Level (PPH) | Sequential MMA | Notched Izod | Gardner | Z-Haze | Yellow Index |
| 20 | Tol | 75 | B.P. | .5 | * | 50 | No | 0.6 | .67 | 23 | 16 |
| 21 | MCB | 75 | B.P. | 1.5 | Dropwise | 50 | Yes | 1.5 | .58 | 24 | 11 |
| 22 | Tol | 100 | B.P. | 1.5 | * | 25 | Yes | 1.2 | .41 | 13 | 6 |
| 23 | MCB | 100 | B.P. | .5 | Dropwise | 25 | No | 0.9 | .47 | 21 | 10 |
| 24 | Tol | 75 | TBPO | .5 | Dropwise | 25 | Yes | 1.0 | .78 | 30 | 10 |
| 25 | MCB | 75 | TBPO | 1.5 | * | 25 | No | 1.5 | .46 | 15 | 8 |
| 26 | Tol | 100 | TBPO | 1.5 | Dropwise | 50 | No | 0.8 | .61 | 42 | 28 |
| 27 | MCB | 100 | TBPO | .5 | * | 50 | Yes | 1.5 | .69 | 32 | 20 |

Tol = Toluene
MCB = Chlorobenzene
TBPO = t-Butyl Peroctoate
* = 50% streamwise over 5-10 minutes, 50% dropwise over 2 hours These examples demonstrate that product performance is very sensitive to the styrene grafting process. Best results are obtained when conditions are optimized for desired applications.

EXAMPLES 28–31

Examples 28–31 were performed as described in Example 19 except that the total monomer (M) to rubber (R) and polymer (P) to rubber ratios were modified in the first step to give the values presented in Table IV. Example 28 demonstrates that a combination of low conversion and low P/R yields unacceptable performance. Example 29 demonstrates that P/R even as low as 1.0 can yield good performance. Example 30 demonstrates higher P/R, e.g., in the range of 3.0 yields good performance Overall performance decreases as P/R is further increased to approximately 10 (Example 31).

TABLE IV

| | Effect of M/R and P/R Ratios | | | |
|---|---|---|---|---|
| Example | M/R | P/R | Notched Izod (ft lbs/in) | Z-Haze (%) |
| 28 | 2.0 | 0.7 | 0.5 | 69 |
| 29 | 1.3 | 1.0 | 1.4 | 12 |
| 30 | 3.0 | 2.9 | 1.3 | 9 |
| 31 | 10.0 | 9.7 | 1.2 | 14 |

EXAMPLE 32

This process was carried out in a manner similar to that in Example 13 except the phenyl containing species was added in the form of poly-alpha-methyl styrene homopolymer. The following properties were observed after diluting with PMMA to 10% rubber: notched Izod=0.8 ft lbs/in; Z-Haze=29%; % transmission=62 and Gardner=0.43 in-lbs/mil. This example demonstrates that addition of the phenyl containing species in the form of a homopolymer is relatively ineffective in improving the performance of PMMA.

EXAMPLE 33

Example 33 was carried out in the manner of Example 13 except the styrene was omitted. This 10% rubber containing product has a notched Izod=1.4 ft lbs/in; Z-Haze=45%. This example demonstrates that no phenyl containing monomer need be added if it is desired to prepare opaque, impact resistant PMMA materials.

EXAMPLES 34 and 35

Examples 34 and 35 were performed in a manner identical to Example 1 except either 2.0 or 0.25 pphr divinyl benzene (DVB) was added to the reaction mixture after P/R reached 1.0, respectively. The higher level of DVB resulted in a crosslinked system; the lower level did not. The properties are presented in Table V.

TABLE V

| Example | DVB Level | Crosslinked | Performance Notched Izod (ft lbs/in) | Z-Haze % |
|---|---|---|---|---|
| 34 | 20 | Yes | 1.1 | 15 |
| 35 | 0.25 | No | 1.8 | 10 |

These examples demonstrate that addition of small amounts of a multifunctional monomer can yield excellent performance but that addition of a level sufficient to allow crosslinking is detrimental. This result is in contrast to standard technology where it is desirable to form discreet crosslinked rubber particles for blending with brittle polymers.

EXAMPLE 36

Example 36 was conducted in the manner of Example 1 except that 1 pphr methyl linoleate was added with the styrene monomer. The final product exhibited a notched Izod=1.5 ft lbs/in; and Z-Haze=11%. This example illustrates that dienes other than DVB can be used as the multifunctional monomer and that the multifunctional monomer can be incorporated at various times within the process.

EXAMPLES 37-40

A modified rubber composition was prepared according to the procedure of Example 13. This composition was diluted with a variety of different commercial PMMA products to a rubber content of 10%. These commercial PMMA products varied in molecular weight and comonomer levels. The data are presented in Table VI. These examples demonstrate that the modified rubber composition can be used to increase the toughness of a variety of PMMA materials. Clarity is essentially independent of PMMA selected while the effectiveness of toughness enhancement is sensitive to PMMA selected.

TABLE VI

| Example No. | PMMA | Gardner (in lbs/mil) | Notched Izod (ft lbs/in) | Z-Haze (%) |
|---|---|---|---|---|
| 37 | H-15 | 0.7 | 1.5 | 13 |
| 38 | H-12 | 0.7 | 1.5 | 15 |
| 39 | H-30 | 0.4 | 1.3 | 13 |
| 40 | L-40 | less than 0.2 | 1.2 | 13 |

EXAMPLE 41

A modified rubber composition was prepared by a procedure similar to Example 13. This composition was diluted with Acrylite ® H-12 PMMA to 10% rubber content. During this process, a stabilizer package comprising 0.12% UV 5411, 0.16% Cyasorb ® 3346, 0.12% Irganox ® 3114, and 0.06% Weston ® 619 was added. The final product exhibited notched Izod=1.4; and Gardner=0.55 for a 20-mil thick sheet. After accelerated aging in a weatherometer for greater than 1500 hours, only small decreases in performance were observed: notched Izod=1.1; Gardner=0.4. This example demonstrates the good weatherability of final products containing the modified rubber composition. It further illustrates the incorporation of small amounts of beneficial additives during processing.

EXAMPLE 42

A high P/R (approximately 9.5) product was made according to the procedure of Example 31. The high P/R value used in the process results in formation of discreet rubber particles within a PMMA matrix. Properties of products prepared in this manner are extremely sensitive to processing conditions. Data are presented in Table VII. The data indicate that the particles are breaking down under the Liestritz processing. In contrast, our preferred modified rubber compositions containing P/R less than 4.0 yield excellent performance even after Leistritz processing (i.e., all data presented in the previous examples). This illustrates one of the major advantages of the preferred rubber composition.

TABLE VII

| Process | Notched Izod (ft lbs/in) | Z-Haze (%) |
|---|---|---|
| Vacuum Dry Then Injection Molding | 1.8 | 20 |
| Leistritz Processing-then Injection Molding | 0.9 | 13 |

EXAMPLES 43-45

Examples 43-45 were performed as described in Example 1 except different highly saturated rubbers were substituted for Epsyn ® 55. The results are presented in Table VIII. These data demonstrate that a variety of rubber systems can be used in this process. The higher viscosity rubbers with approximately 10 double bonds per 1000 carbon atoms (10c=c/1000c) are preferred.

TABLE VIII

| Example No. | Rubber | Mooney Visc. (cp at 125° C.) | c = c/1000 c | Notched Izod (ft lbs/in) | Z-Haze (%) |
|---|---|---|---|---|---|
| 1 | Epsyn 55 | 55 | approx. 9 | 1.7 | 7 |
| 43 | Epsyn 4906 | 40 | approx. 8 | 1.5 | |
| 44 | Epsyn 2506 | 25 | approx. 4 | 0.8 | 19 |
| 45 | Epsyn DE230 | — | approx. 12 | | |

Graft Analysis

The grafts prepared in these processes have been analyzed by reprecipitation-chromatography techniques well known to those experienced in the art. (See, for example, J. Ma, D. Pang and B. Huand, J. Poly. Sci. A., Poly. Chem. 1986, 2853-2866; A. Gadkari and M. F. Farona, Poly. Bull. 1987, 17, 299-306.) Data for several samples are summarized in Table IX. For the procedure as described in Example 1, greater than 66% of the monomers which reacted during the phenyl graft or first step became grafted onto the rubber. Less grafting occurred in the second step, but still greater than 30% of the monomers added in the second step became grafted onto the rubber. The overall graft efficiency for both steps, i.e., the amount of monomers converted to grafted species divided by the amount of monomers converted to copolymers was 0.44.

TABLE IX

| Example No. | Z-Haze (%) | Notched Izod (ft lbs/in) | Gardner (in lbs/mil) | Total Monomer Grafted PPHR | Graft Efficiency | Mol Wt $M_N$ ($\times 10^3$) | Mol Wt $M_W$ ($\times 10^3$) |
|---|---|---|---|---|---|---|---|
| 1 | 7 | 1.7 | .6 | 91 | .44 | 25 | 43 |
| 46 | 7 | 1.6 | .7 | 82 | .41 | — | — |
| 47 | 8 | 1.5 | .7 | 83 | .45 | — | — |

TABLE IX-continued

| Example No. | Z-Haze (%) | Notched Izod (ft lbs/in) | Gardner (in lbs/mil) | Total Monomer Grafted PPHR | Graft Efficiency | Mol Wt $M_N$ ($\times 10^3$) | Mol Wt $M_W$ ($\times 10^3$) |
|---|---|---|---|---|---|---|---|
| 48 | 11 | 1.6 | .6 | 81 | .41 | 23 | 32 |
| 11 | 9 | 1.4 | .7 | 116 | .55 | 24 | approx 38 |
| 12 | 9 | 1.5 | — | 97 | .46 | 28 | 41 |
| 7 | 9 | 1.5 | .6 | 110 | .53 | 26 | 46 |
| 49 | 9 | 1.4 | .5 | 86 | .44 | 20 | 30 |
| 50 | 10 | 1.4 | — | 72 | .43 | 20 | 30 |
| 51 | 17 | 1.3 | — | 60 | .35 | 19 | 29 |
| 52 | 9 | 1.1 | — | 109 | .31 | 29 | 55 |
| 53 | 20 | 0.8 | .4 | 50 | .25 | 16 | 29 |

The data in Table IX demonstrate that the most effective increase in strength is observed when (1) the total amount of monomers grafted onto the rubber is greater than 60 pphr; (2) graft efficiency exceeds 0.35, and preferably exceeds 0.40; and (3) $M_N$ exceeds 20,000 g/mole. However, taking into account the scatter in the data, we believe that good results may be achieved when the total amount of monomers grafted is about 50 parts per hundred rubber, about 0.10 graft efficiency and equal to about 10,000.

Example 46 was prepared in a manner similar to Example 1 except it was started in a continuous rather than a batch mode.

Example 47 was prepared in a manner similar to Example 13 except the batch size was increased.

Example 48 was prepared in a manner similar to Example 1 except that 50% of the total MMA was added in the initial stage.

Example 49 was prepared in a manner similar to Example 1 except the first step was made in a larger batch.

Example 50 was prepared in a manner similar to Example 1 except that it was finished at 110° C. for 5 hours.

Example 51 was prepared in a manner similar to Example 1 except that 70% of the MMA was added in the initial stage.

Example 52 was prepared in a manner similar to Example 1 except that the total monomer to rubber level was increased to 4.0.

Example 53 was prepared in a manner similar to Example 68 (see below) except that the product was vacuum dried and then blended with Acrylite ® H-12.

EXAMPLE 54

EPDM as Rubber, no refractive index matching 100 g of Polysar ® 585 are dissolved in 400 g of butyl acetate at 120° C. To this slightly turbid solution, a mixture of 200 g MMA, 300 g butyl acetate, and 3 g t-butylper-2ethylhexanoate is added dropwise during 4 hours. An additional 30 minutes of mixing takes place at 120° C. The solution is cooled to 80° C. and a mixture of 5 g MMA, 5 g diallyl succinate, 5 g trisallylcyanurate (TAC) and 2 g of t-butylper-2ethyl hexanoate is added. The solution continues to be stirred for 4 hrs. at 80° C. and is subsequently heated to 110° C. for 30 minutes. After this batch is cooled down, the solvent removed and (PMMA) blended with it to obtain a 10% EPDM level. The resulting product is characterized as follows:
SZ=47 KJ/m²
KSZ=6.7 KJ/m²
VST=101° C.
L=89° C.
B=54.5
s=2260 Ns/m²

Where:

| SZ | (Schlagzahigkeit = impact strength) and |
| KSZ | (Kerbschlagzahigkeit notch impact strength) are both according to German Standard DIN 53 453; |
| VST | (VICAT softening temperature) according to DIN 53 460; |
| s | (Schmelzviskositat melt viscosity) according to DIN 54 811 at L/D = 4/1; p = 5 N/mm²; T = 220° C.; |
| L | (Lichtdurchlassigkeit = Light transmittance) according to HUNTER; |
| B | (Strangaufweitung = strand enlargement) equals $$\frac{\text{Strand diameter}}{\text{Orifice diameter}} - 1$$ strand formed in determining $s200/5$. |

EXAMPLE 55

EPDM as Rubber, addition of monomers with increased refractive index during grafting To a solution of 100 g EPDM (Polysar ® 585) and 2 g t-butyl-perhexanoate in 200 g butylacetate and 200 g toluene; a mixture of 200 g MMA, 300 g butyl acetate and 1 g t-butylperhexanoate is added dropwise at 90° C. over a period of 4 hrs. After cooling to 80° C., a mixture of 200 g t-butylperhexanoate, 5 g TAC, 5 g MMA and 10 g 3-phenylpropylacrylate are added and stirred for 4 hrs. at 80° C. One obtains a stable dispersion, which is precipitated in methanol and dried. Subsequently, it is blended with Plexiglas ® Y8N to a 5% (wt) EPDM level. Moldings with good surface gloss are obtained, characterized by:
SZ=25 KJ/m²
KSZ=4.6 KJ/m²
VST=105° C.
L=92.4° C.
B=56%
s=3190 Ns/m²

EXAMPLES 56–62

100 g of Polysar ® 585 were dissolved in 400 g butylacetate at 120° C. To this solution while stirred, a mixture of 198 g methylmethacrylate, 2 g methyl acrylate, 30 g butylacetate 3 g t-butylper-2-ethylhexanoate was added dropwise over 2 hrs. Stirring was continued an additional 15 min. at 120° C. After cooling to 80° C., a mixture of 5 g methyl methacrylate, 5 g diallyl succinate, 5 g trisallylcyanurate, 2 g t-butylper-2-ethylhexanoate was added while stirring for 2 hrs. at 80° C. The mixture was heated to 100° C. and stirred 2 hrs. at 100° C. After cooling to room temperature, a stable, easily handleable dispersion was obtained which was precipitated in methanol and subsequently dried. Following this, and addition of Plexiglas ® Y8N (PMMA), one obtains blends with an EPDM level from 1-10% (wt) (for results see Table X). Using a sample with a 10% EPDM level, the notched Izod was measured: 1.1 fppi (foot pounds per inch).

TABLE X

Effect of Rubber Concentration on Key Properties
Laboratory-Scale Polymerization. Rubber:L Polysar 585
Rubber Concentration: 33% in Plexiglas Y8N

| Run | Rubber (Weight %) | VST (°C.) | SZ (KJ/MM$^2$) | KSZ | $\eta_s$ (Ns/M$^2$) | B (%) | L (%) | Haze (%) |
|---|---|---|---|---|---|---|---|---|
| 56 | 10 | 103 | 46 | 6.1 | 2268 | 65 | 89.5 | 59 |
| 57 | 8 | 103 | 43 | 5.1 | 2159 | 59 | 91.2 | 52 |
| 58 | 6 | 105 | 44 | 4.8 | 2351 | 58 | 92.7 | 44 |
| 59 | 4 | 107 | 42 | 3.8 | 2351 | 56 | 93.2 | 37 |
| 60 | 3 | 108 | 33 | 2.6 | 2472 | 54 | 93.8 | 30 |
| 61 | 2 | 109 | 32 | 2.1 | 2518 | 53 | 94.8 | 21 |
| 62 | 1 | 110 | 20 | 1.4 | 2583 | 50 | 95.8 | 10 |

EXAMPLE 63

Methyl methacrylate grafting at higher dilutions

Procedure as in example 56, but starting with a 10% EPDM dilution (100 g Polysar ® dissolved in 900 g butyl acetate). After completion and blending with Plexiglas ® Y8N to 10% by weight of rubber, a product is obtained which is significantly inferior to the molding compound from example 56 especially in notched impact strength and notched Izod. Characterizing values were:

SZ = 45 KJ/m$^2$
KSZ = 3.5 KJ/m$^2$
VST = 102° C.
Haze = 74%

EXAMPLE 64

Matching of the refractive indexes of the phases through addition of Polyvinylidene fluoride (PVDF)

One proceeds as in example 56, and the mixture containing approximately 33% EPDM by weight is isolated, and subsequently blended with Plexiglas ® Y8N (PMMA) and PVDF. The properties of this molding compound are compared with those of the molding compound from example 3 in Table XI. As case be seen, addition of PVDF results in a significant improvement of the haze and an improvement in impact strength.

TABLE XI

Refractive Index Matching of EPDM
Modified PMMA by Blending with PVDF

| Run | Polysar ® 585 (%) | PVDF (%) | VST (°C.) | SZ (kJ/m$^2$) | KSZ | Notched (fppi) | Izod Haze (%) |
|---|---|---|---|---|---|---|---|
| 56 | 10 |   | 103 | 46 | 6.1 | 1.1 | 59 |
| 64 | 9 | 9 | 93 | 69 | 8.2 | 1.7 | 17 |

EXAMPLE 65

The batch as in example 56 is repeated but another rubber is used (Epsyn ® 55) and the reaction is carried out in a larger vessel.

The amounts used: 3000 g Epsyn ® 55, 12,000 g Butyl acetate as well as corresponding amounts of methyl methacrylate etc. Finishing is described as in example 56; the modified rubber product is blended with Plexiglas ® Y8N (PMMA) to a 10% EPDM level giving:

| VST: | 103° C. |
|---|---|
| SZ: | 51 KJ/m$^2$ |
| KSZ: | 6.2 KJ/m$^2$ |

EXAMPLE 66

The modified rubber product obtained in example 65 is blended as follows:

45% (wt) modified rubber product
46% (wt) Plexiglas ® Y8N
9% (wt) PVDF

A transparent, high impact injection molding compound is obtained characterized by:

KSZ 9.2 KJ/m$^2$
Haze 11%

EXAMPLE 67

A batch according to example 56 is repeated using 100 g Epsyn ® 55 as rubber (following example 65), and the total amount of monomer is added directly to the EPDM solution rather than creating a dry modified intermediate rubber product.

Therefore 100 g of Epsyn ® 55 are dissolved in 400 g butyl acetate and 891 g of methyl methacrylate and 9 g of methylacrylate in butyl acetate are directly added dropwise. The finished dispersion is precipitated in methanol and granulated as an injection molding compound. The compound shows good optics, but is poorer in its thermoplastic workability (break-up during extrusion) and impact resistance having the following characteristics:

| VST: | 93° C. |
|---|---|
| SZ: | 13 KJ/m$^2$ |
| KSZ: | 2.5 KJ/m$^2$ |
| Haze: | 8.9% |

EXAMPLE 68

Modified rubber product with addition of a block copolymer to match refractive indexes Technical Scale Run 2,100 g Shellvis ® 50
4,900 g Epsyn ® 55 Dissolved at 120° C. within 3 hrs.
28,000 g butyl acetate
13,860 g MMA
140 g MA - Added during 2 hrs. at 120° C.
210 g t-butyl-peroctoate
21,000 g butyl acetate
700 g mixture of TAC/MMA - 1/1
140 g t-butyl-peroctoate
Crosslinking 2 hrs. at 80° C.

Additional crosslinking at 90° C.—2 hrs. Isolating the intermediate modified rubber product by removing the solvent in an extruder.

EXAMPLES 69-75

In the following examples, the properties of PMMA products of example 68 are presented as obtained with various Plexiglas ® Y8N (PMMA) concentrations. The total rubber (wt %) is made up of the total of Shellvis ® 50 and Epsyn ® 55 used.

TABLE XII

Effect of Rubber Concentration on Key Properties
Technical-Scale Polymerization. Rubber: Epsyn ® 55/
Shellvis ® 50, ratio 70/30. Rubber Concentration in
intermediate rubber product: 33% added to Plexiglas ® Y8N.

| Example** | Rubber (Weight %) | SZ | KSZ (kJ/m$^2$) | L | Y | a | b | Haze (%) |
|---|---|---|---|---|---|---|---|---|
| 69 | 11.7 | 45 | 5.4 | 93.3 | 87.0 | −0.57 | 2.57 | 14.4 |
| 70 | 10 | 42 | 4.9 | 93.4 | 87.2 | −0.50 | 2.33 | 14.7 |
| 71 | 8 | 31 | 4.7 | 93.9 | 88.1 | −0.45 | 2.09 | 11.9 |
| 72 | 6 | 41 | 4.4 | 94.1 | 88.6 | −0.43 | 1.94 | 10.6 |
| 73 | 4 | 30 | 3.0 | 94.7 | 89.7 | −0.28 | 1.36 | 7.6 |
| 74 | 2 | 25 | 2.0 | 95.3 | 90.8 | −0.23 | 1.09 | 5.5 |

**Injection Molded Samples

As seen in Table XII, properties change steadily with rubber level.

TABLE XIII

EPDM - Modified - PMMA
Temperature Dependence of SZ and KSZ
Technical-Scale Polymerization. Rubber: Epsyn ® 55/
Shellvis ® 50, ratio 70/30. Rubber Concentration in
intermediate rubber product: 33% added to Plexiglas ® Y8N.

| Example | 70* | 73* | 75** |
|---|---|---|---|
| Rubber (weight %) | 10 | 4 | 10 |
| Addition of PVDF (weight %) | — | — | 2 |
| VST/16h 100° C. | 109 | 113 | 101 |
| Haze (%) | 10.4 | 7.5 | 6.3 |
| Sz (kJ/m$^2$) | | | |
| 25° C. | 47 | 31 | 38 |
| 10° C. | 42 | 26 | 24 |
| 0° C. | 34 | 20 | 23 |
| −10° C. | 39 | 27 | 23 |
| −20° C. | 30 | 18 | 23 |
| KSZ (kJ/m$^2$) | | | |
| 25° C. | 4.9 | 3.8 | 5.4 |
| 10° C. | 4.6 | 3.5 | 4.8 |
| 0° C. | 4.3 | 3.1 | 4.4 |
| −10° C. | 3.8 | 2.5 | 4.2 |
| −20° C. | 3.6 | 2.4 | 3.5 |

*Extruded Sample
**Injection Molded Sample

Table XIII shows the good cold temperature impact strength of this system for three particular injection molding compounds. As previously mentioned, the optical properties can also be improved through addition of PVDF.

TABLE XIV

EPDM - Modified - PMMA
Effect of Shear Stress on Mechanical and Optical Properties

| Example | Preparation of Modified Rubber Product | Processing | SZ (kJ/m$^2$) | KSZ (kJ/m$^2$) | L (%) | Haze (%) |
|---|---|---|---|---|---|---|
| 68 | Precipitation | Injection Molding | 41 | 5.1 | 93.0 | 20.5 |
| 68 | Devolatilizing by Extrusion | Injection Molding | 42 | 4.9 | 93.4 | 14.7 |
| 68 | Devolatilizing by Extrusion | Extrusion | 47 | 4.9 | 94.5 | 10.4 |

Technical-Scale Polymerization in Butylacetate: 33% Rubber in Plexiglas ®Y8N to 10% Rubber.

Table XIV shows the good shear stability of this injection molding compound (retention of impact properties even after multiple extrusions). Table XIV also shows that multiple extrusions can improve the haze.

TABLE XV

EPDM - Modified - PMMA
Effect of Matrix PMMA on Mechanical and Optical Properties

| Example | Rubber (weight %) | Matrix - PMMA | VST (°C.) | SZ (kJ/m$^2$) | KSZ | L (%) | Haze (%) |
|---|---|---|---|---|---|---|---|
| 68 | 10 | Plexiglas ® 8N | 101 | 42 | 4.9 | 93.4 | 14.7 |
| 68 | 10 | Plexiglas ® 7N | 99 | 48 | 5.2 | 94.4 | 11.5 |
| 68 | 10 | Plexiglas ® 6N | 93 | 48 | 5.1 | 95.0 | 7.5 |

Technical-Scale Polymerization in Butylacetate: masterbatch with 33% Rubber, let down with Plexiglas ® to 10% rubber; injection molded samples.

Table XV also shows the properties of material from example 68. As can be recognized, the optics can be improved by the proper choice of the type of PMMA molding compound, increasing the amount of copolymerized methyl acrylate (Plexiglas ® 8N Plexiglas ® 6N) results in a significant reduction in haze.

Figure 6:
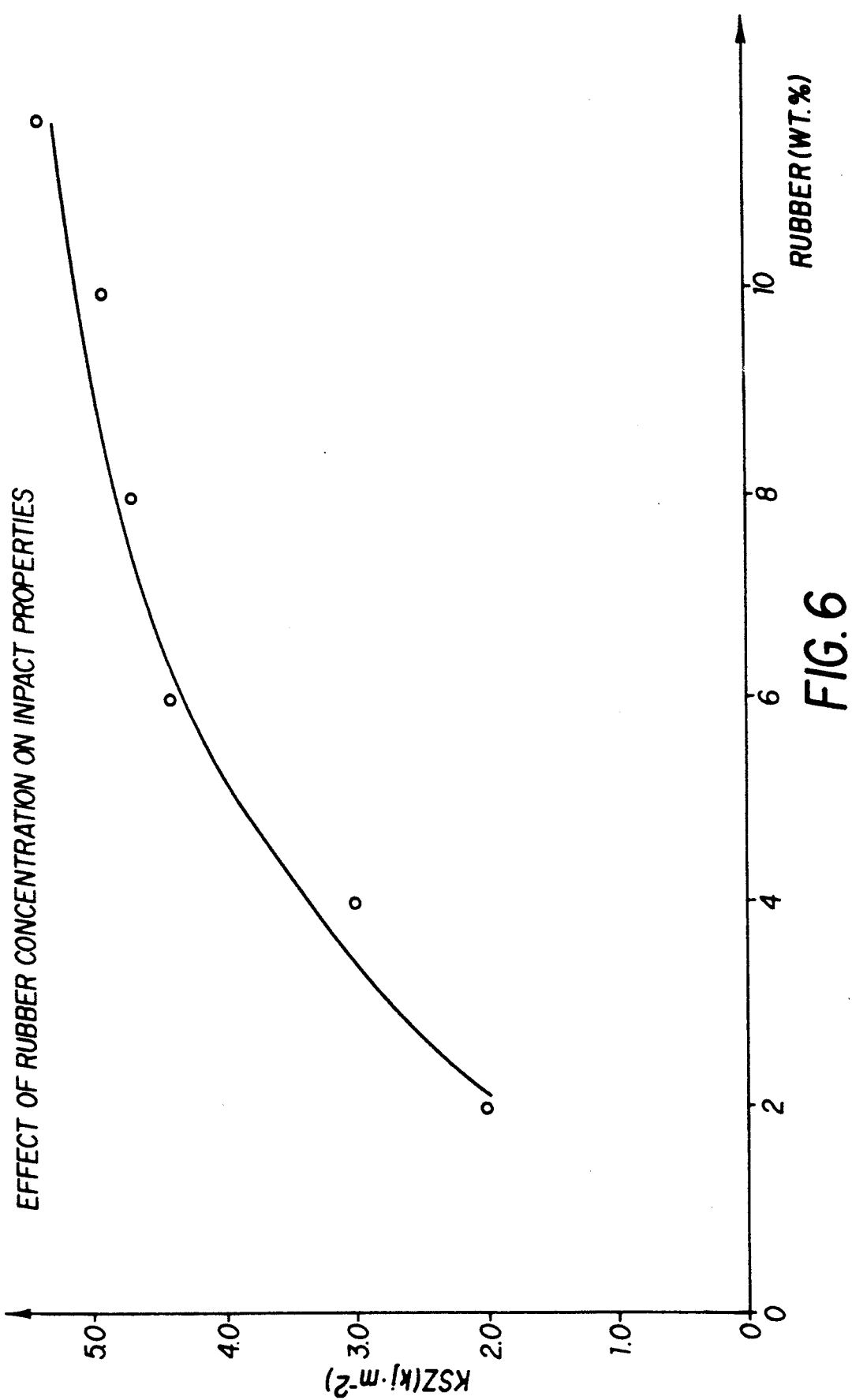
FIG. 6 is a graph of impact properties versus rubber content of PMMA products reinforced with a second composition according to the invention.
Figure 7:
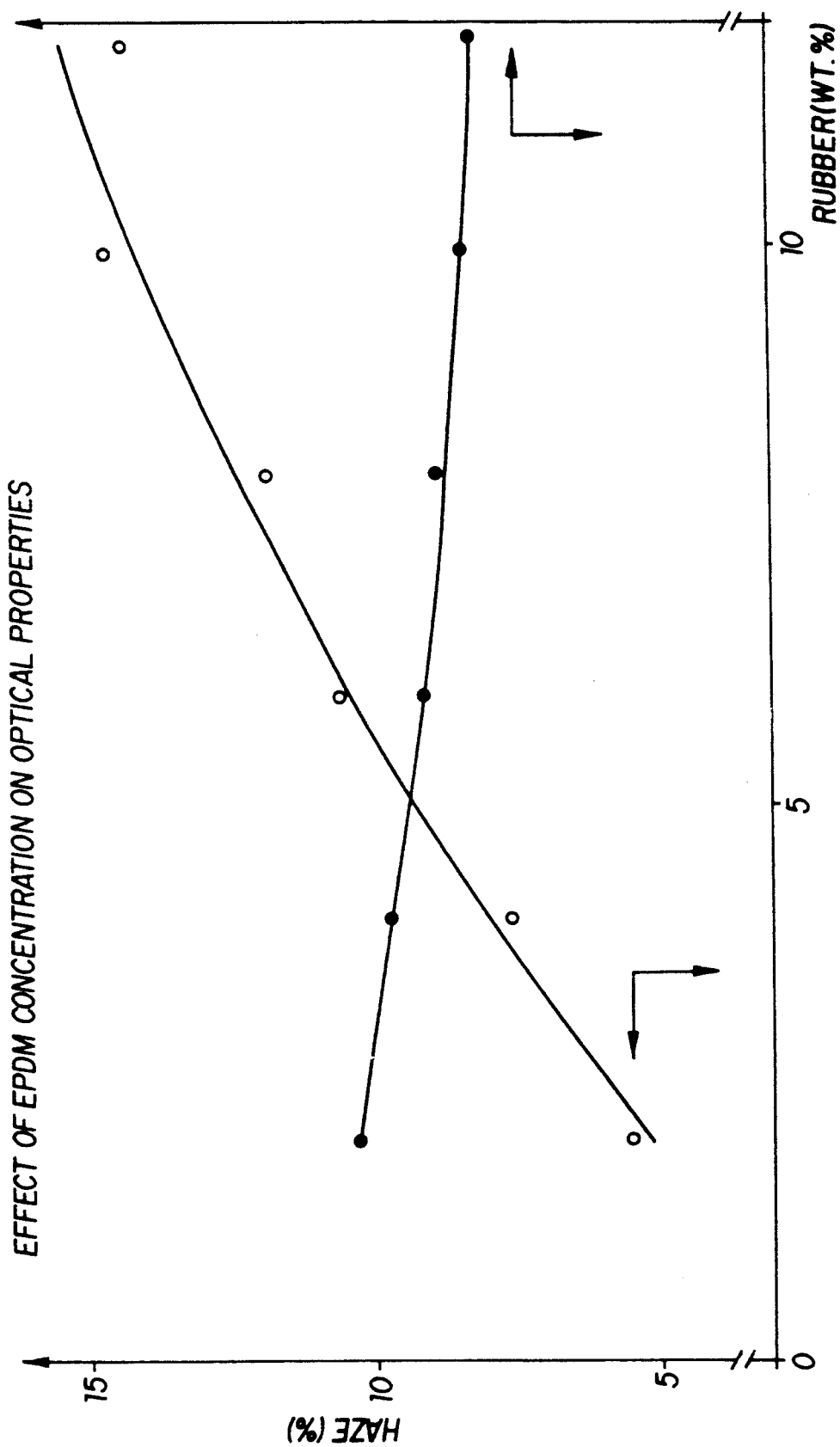
FIG. 7 is a graph of haze and transmittance versus rubber content of PMMA products reinforced with said second composition according to the invention.
Figure 8:
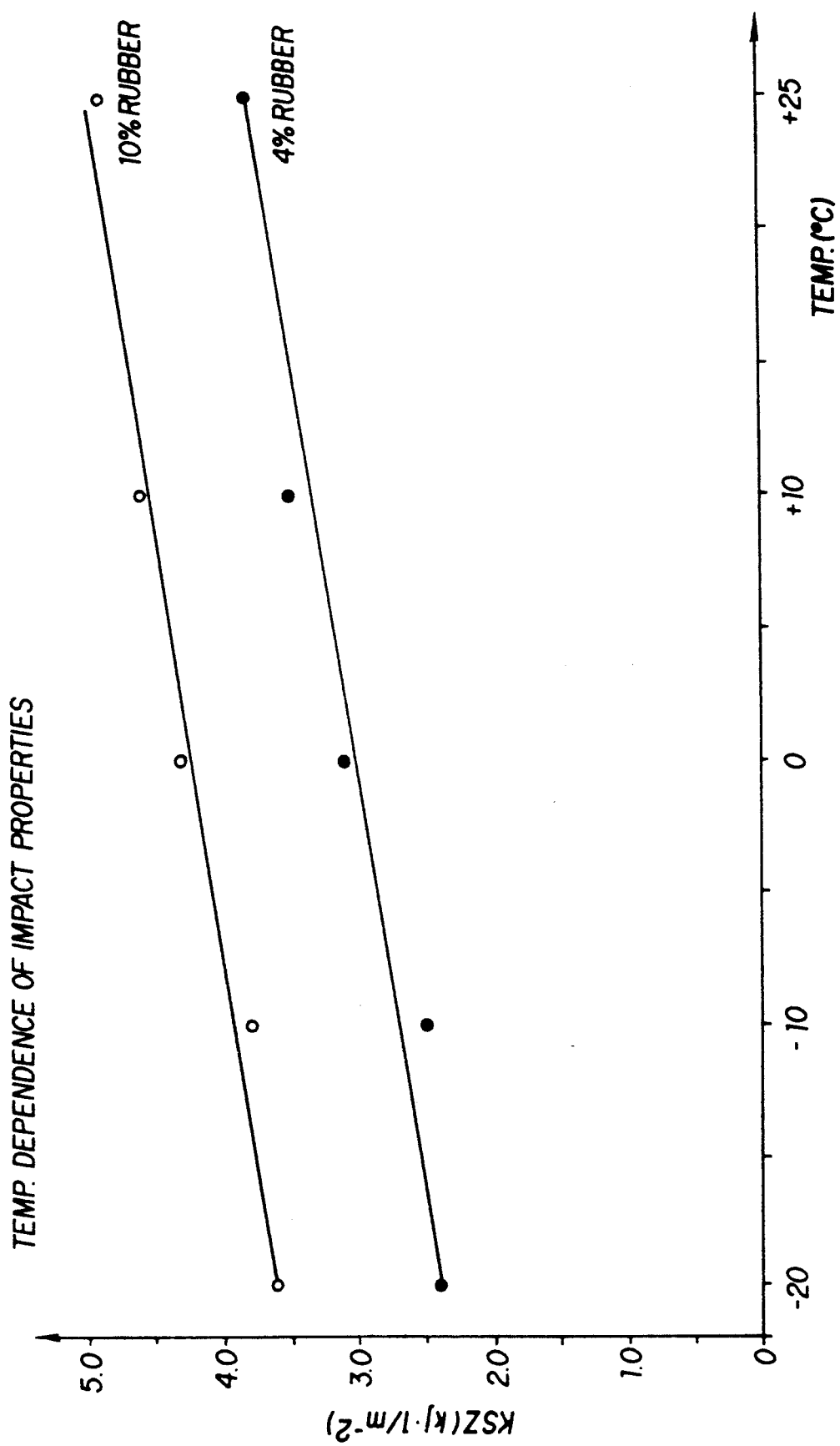
FIG. 8 is a graph of impact properties versus temperature of PMMA products reinforced with said second composition.

In FIGS. 6-8, key properties are once again presented. (All data is based on example 68 as the starting material).

FIG. 6 illustrates the effect of rubber concentration on impact properties, the ratio of Epsyn ® 55 to Shellvis ® 50 being 70/30. FIG. 7 shows the effect of rubber concentration on optical properties at the 70/30 ratio. FIG. 8 shows the temperature dependence of impact properties, at the 4% rubber and 10% rubber levels, again at the ratio of 70/30 of Epsyn ® 55 to Shellvis ® 50.

EXAMPLE 76

In an alternate procedure, 120 g Epsyn ® 55 and 30 g Kraton ® 1701 were dissolved in 860 g toluene at 75° in a jacketed, conical flange resin reaction flask with a mechanical stirrer, reflux condenser, inert gas inlet and exit bubbler and a port for an addition funnel. The flask and rubber solution were purged with nitrogen.

Styrene 38g, 5 g methylacrylate, 257 g methyl methacrylate and 5.1 g benzoyl peroxide were added to a graduated addition funnel fitted with a metering teflon stopcock. The solution was purged with dry ice and attached to the resin reactor. The total volume of monomer solution was 325 mL.

The monomer solution was added dropwise to the stirred rubber solution at 75° C. over a period of 2 hours. After an additional 30-45 minutes, the reaction solution viscosity had increased so that stirring was inefficient and, therefore, was discontinued. The reaction was allowed to proceed overnight at 75° C.

The product was removed from the flask and cut into pieces This material was air dried overnight and then vacuum dried at 140° C. for at least 4 hours The weight of dried polymer was 435 g. Assuming complete recovery of initial rubber and Kraton, the yield of polymers from the added monomers was 285g, 95% conversion, to give a PMMA/rubber ratio of 1.9/1.0.

This concentrated rubber-PMMA composite was blended with pure PMMA to give a 8% EDPM rubber product (245 g PMMA per 100 g rubber-PMMA concentrate). The material was processed in the standard manner and characterized. The performance data were Z-Haze=10%; Transmission=90%; notched Izod=1.2 ft lb/in; Gardner=0.35 in lbs/mil; Y-Haze=7%; X TM Haze=8% and Yellow Index=6%. After aging for a few days, optical performance is essentially unchanged: Z-Haze=11%; Y-Haze=8%; X=Haze=8%; Transmission=89%.

EXAMPLES 77-97

These examples were performed as described for Example 20 except for the changes indicated in Table XVI. Data are for products containing 8% EDPM rubber.

Figure 9:
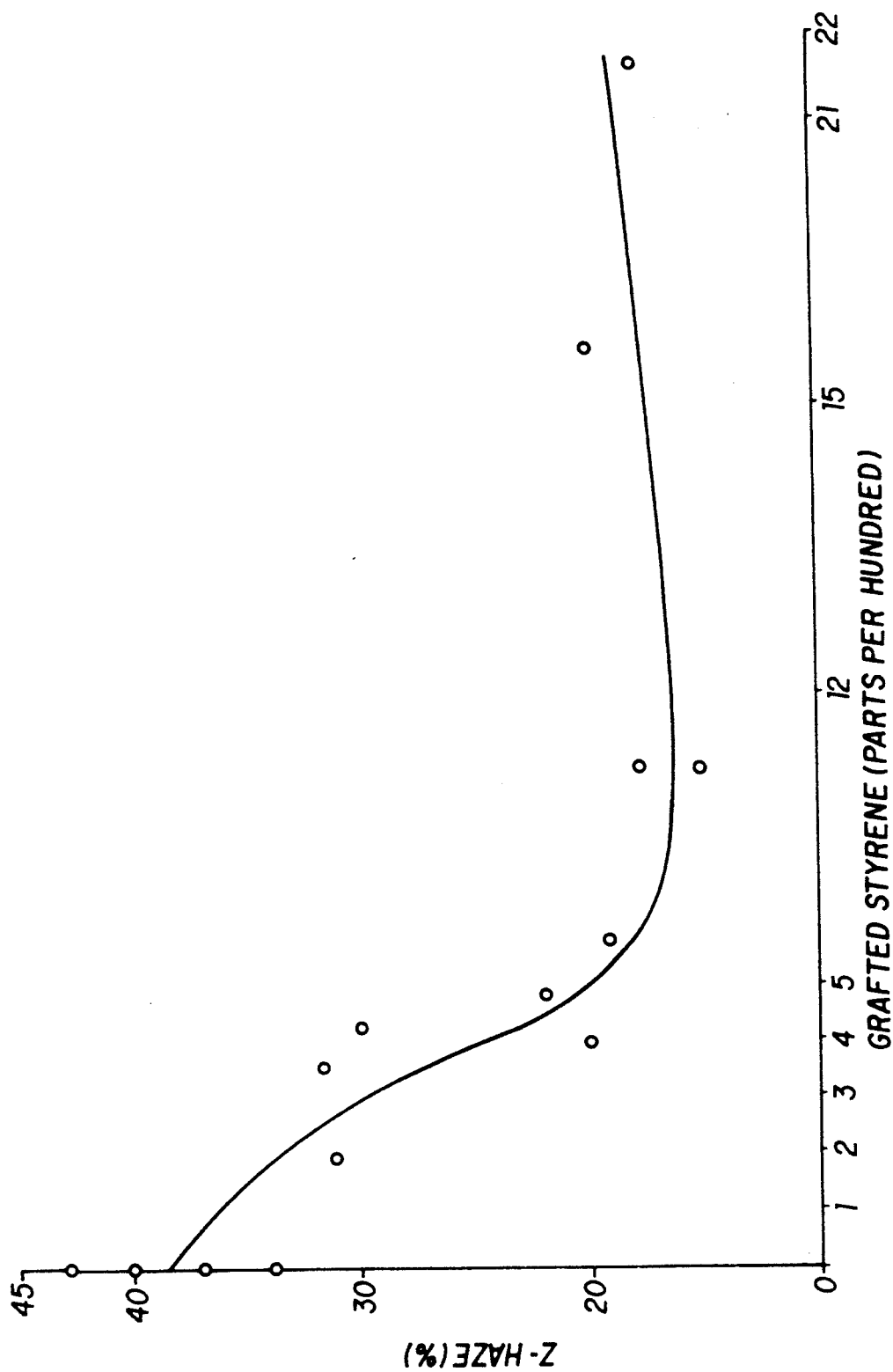
FIG. 9 is a graph of haze versus grafted styrene content of polymethylmethacrylate products reinforced with a third composition according to the invention.

FIG. 9 is a graph of Z-haze versus grafted styrene content in parts per hundred parts of EPDM.

FIG. 10 is a graph of Z-haze versus the weight percent of block copolymer (Shellvis ® 50) versus total rubber content, i.e. Shellvis ® 50 plus EPDM.

Examples 77 and 78 demonstrate that poor optical performance is obtained when no block copolymer is used. Examples 79-97 demonstrate that process variables must be carefully controlled to obtain optimum performance. In general, initiator levels in excess of 1.5 pph are preferred. Example 90 demonstrates that very poor optical performance is observed if pure polystyrene is added in place of styrene monomer. Example 87 illustrates good performance from the use of a triblock copolymer.

These examples further illustrate the improved optical performance which can be achieved by the use of styrene monomer in the process.

TABLE XVI

Polymer Blend Runs with Additional Styrene

| Example No. | Block Copolymer (PPH) | Additional Sty (PPH) | Initiator Level (PPH) | Temp | Profile[a] | P/R | Total Sty Content (PPH) | Z-Haze (%) | Notched Izod (ft-lb/in) |
|---|---|---|---|---|---|---|---|---|---|
| 77 | None | 33 | (3.4) | 90 | DPWS | 1.8 | 33 | 23 | 1.4 |
| 78 | None | 45 | (3.4) | 75 | Split | 1.7 | 45 | 14 | 1.3 |
| 79 | Kraton 1701 (20) | 15 | (3.3) | 75 | Split | 1.8 | 22 | 9 | 1.3 |
| 80 | Kraton 1701 (20) | 15 | (2.6) | 75 | Split | 1.9 | 22 | 9 | 1.1 |
| 81 | Kraton 1701 (20) | 17 | (1.7) | 75 | Sigma | 0.6 | 24 | 25 | 1.0 |
| 82 | Kraton 1701 (20) | 25 | (1) | 90 | DPWS | 1.5 | 32 | 25 | 0.7 |
| 83 | Kraton 1701 (20) | 25 | (3.3) | 90 | DPWS | 1.9 | 32 | 8 | 0.9 |
| 84 | Kraton 1701 (20) | 25 | (3.3) | 75 | DPWS | 1.9 | 32 | 10 | 1.2 |
| 85 | Kraton 1701 (20) | 26 | (1) | 90 | Split | 1.5 | 33 | 20 | 1.0 |
| 86 | Kraton 1650 (05) | 33 | (3.4) | 90 | DPWS | 1.8 | 35 | 14 | 1.3 |
| 87 | Kraton 1650 (20) | 33 | (3.4) | 90 | DPWS | 1.8 | 39 | 10 | 1.3 |
| 88 | Kraton 1701 (20) | 33 | (3.4) | 90 | DPWS | 1.9 | 40 | 7 | 1.2 |
| 89 | Kraton 1701 (20) | 33 | (3.4) | 75 | DPWS | 1.9 | 40 | 9 | 1.5 |
| 90 | Kraton 1701 (20) | 33 | (1.7) | 75 | Split | 1.8 | 40 | 9 | 1.4 |
| 91 | Kraton 1701 (20) | 33 | (1.7) | 75 | Split | 1.7 | 40 | 11 | 0.6 |
| 92 | Kraton 1701 (20) | 33 | (1) | 90 | Split | 1.4 | 40 | 13 | 0.7 |
| 93 | Kraton 1701 (20) | 33 | (2.1) | 75 | Split | 1.8 | 40 | 11 | 1.4 |
| 94 | Shellvis 50 (20) | 33 | (3.4) | 90 | DPWS | 1.9 | 43 | 8 | 1.3 |
| 95 | Shellvis 50 (10) | 38[b] | (3.4) | 90 | DPWS | 1.7 | 43 | 90 | 1.2 |
| 96 | Kraton 1701 (20) | 40 | (3.3) | 90 | DPWS | 1.8 | 47 | 11 | 1.0 |
| 97 | Kraton 1701 (20) | 30 | (1) | 90 | DPWS | 1.3 | 57 | 11 | 0.5 |

[a]DPWS = Dropwise addition of monomers over 2 hours.
Split = 50% of monomers added over - 10 minutes, 50% added dropwise over 2 hours.
Sigma = Sigma Mixer used
[b]Added as polystyrene

EXAMPLE 98

This example was prepared in the manner of Example 13 except that in the acrylate grafting step the combined amount of methylmethacrylate and methylacrylate was 137 pphr, the amount of B.P. initiator was 0.5 pphr and the entire monomer-initiator solution was added to the phenyl graft over 5-10 minutes. The ratio of polymer to rubber, P/R, of the product was 1.35. The 10% rubber containing acrylate product has Z-haze=12%, Notched Izod=1.2 ft lb/in, and Gardner=0.34 in lb/mil for a 20-mil sheet. This example demonstrates that good performance can be obtained when P/R is as low as 1.35. We believe acceptable results in some cases could be obtained with P/R as low as 1.30

EXAMPLE 99

This example was prepared in the manner of Example 19 except the total level of methylacrylate was reduced to 3 pphr. The product was blended with Acrylite ® H-12 and processed to yield a composite which exhibited the following properties: Z-haze=12%, Notched Izod=1.6 ft lb/in, and Gardner=0.2 in lb/mil. A portion of the product which had not been blended with Acrylite ® H-12 was subjected to the reprecipitation chromatography techniques described above. The $M_N$ for the graft chains was 39,000 daltons; MW was 67,000 daltons. This example demonstrates the preparation of relatively high molecular weight graft chains. We believe that $M_N$ in the 50,000 dalton range can be attained.

From our examples we calculate that for a styrene grafted EPDM used to reinforce PMMA, the notched Izod in foot pounds per inch is greater than or equal to 0.1 foot pounds per inch times R plus 0.2 foot pounds per inch, and Z-haze in percent is less than or equal to R plus 2 percent, where R is the weight percent of EPDM rubber present in the final polyacrylate product.

For products incorporating the block copolymers, e.g. Shellvis or Kraton, the notched Izod follows the same formula; however, the Z-haze in percent is less than or equal to R plus 4 percent.

We have thus provided modified aliphatic, highly saturated rubber such as EPDM to which acrylates have been grafted with high efficiency for reinforcing polyacrylate products. We have further provided such modified rubber products which provide reduced haze by incorporating a polymer either in the rubber or in the acrylate phase, which modifies the index of refraction thereof towards the other phase and thus provides a final polyacrylate product of reduced haze.

The index modifying polymer in the rubber phase may be a block copolymer, or a polymer grafted to the rubber.

The index modifying polymer incorporated into the acrylate phase according to our invention decrease the index of refraction of this phase to bring it more in line with the rubber phase, and preferably incorporates fluorine containing monomer units, particularly polyvinylidenefluoride.

It will thus be seen that the objects set forth above among those made apparent from the preceding description are efficiently attained, and since certain changes may be made in carrying out the above methods, and in the above compositions and products, without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly it is to be understood that in the claims ingredients or compounds recited in the singular are intended to include compatible mixtures of such ingredients wherever the sense permits. The adjective "about" before a range is intended to apply to both the upper and the lower limits.

What is claimed is:

1. A modified rubber composition for reinforcing polyacrylate products by adding it to acrylate or polyacrylate comprising, apart from solvent, by weight percent
    A) About 15 to 60% of at least one highly saturated rubber having less than 1% carbon-carbon double bonds in its main chain and more than 0.1% carbon-carbon double bonds in its side chain;
    B) about 25 to 80% of acrylate monomer units of the structure

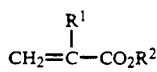

where $R^1$ is selected from the group consisting of H and an alkyl group, and $R^2$ is an alkyl group comprising less than about 9 carbon atoms; wherein greater than about 10% of said monomer units are present in the form of polymer chains grafted to said rubber and less than about 90% of said monomer units are not grafted to said rubber; and at least 85% of the homopolymers and copolymers of said acrylate monomer units have a $T_g$ between 50°-170° C.

2. The composition defined in claim 1 wherein greater than about 20% of said monomer units are present in the form of polymer chains grafted to said rubber.

3. The composition defined in claim 1 wherein greater than about 30% of said monomer units are present in the form of polymer chains grafted to said rubber.

4. The composition defined in claim 1 wherein said polymer chains have a number average molecular weight greater than about 10,000 daltons.

5. The composition defined in claim 1 wherein said polymer chains have a number average molecular weight greater than about 15,000 daltons.

6. The composition defined in claim 1 further defined as comprising two amorphous, heterogeneously dispersed phases, the first comprising said rubber and said monomer units grafted thereto, the second comprising said ungrafted monomer units.

7. A modified rubber composition for reinforcing polyacrylate products comprising, apart from solvent, by weight percent
    A) about 15 to 50% of at least one highly saturated rubber having less than 1% carbon-carbon double bonds in its main chain and more than 0.1% carbon-carbon double bonds in its side chain;
    B) about 25 to 75% of acrylate monomer units of the structure

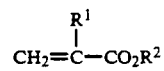

where $R^1$ is selected from the group consisting of H and an alkyl group, and $R^2$ is selected from the group consisting of an alkyl group, said groups each comprising less than about 9 carbon atoms; wherein a portion of said monomer units are present in the form of polymer chains grafted to said rubber, said chains having a number average molecular weight less than about 80,000 daltons; and wherein at least 85% of the homopolymers and copolymers of said acrylate monomer units have a $T_g$ between 50°-170° C.

8. The composition defined in claim 7 wherein greater than about 10% of said monomer units are present in the form of polymer chains grafted to said rubber.

9. A modified rubber composition for reinforcing polyacrylate products by adding it to acrylate or polyacrylate comprising, apart from solvent, by weight percent
    A) about 15 to 50% of at least one highly saturated rubber having less than 1% carbon-carbon double bonds in its main chain and more than 0.1% carbon-carbon double bonds in its side chain; and
    B) about 25 to 75% of acrylate monomer units of the structure

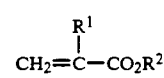

where $R^1$ is selected from the group consisting of H and an alkyl group, and $R^2$ is selected from the group consisting of an alkyl group, said groups each comprising less than about 9 carbon atoms; wherein at least 85% of the homopolymers and copolymers of said acrylate monomer units have a $T_g$ between 50°-170° C.; and said composition comprising two amorphous, heterogeneously dispersed phases in which greater than about 20% of said monomer units are present in the first phase in the form of polymer chains grafted to the rubber and less than about 80% of the monomer units are present in the second phase and are not grafted to the rubber.

10. The composition defined in claim 9 wherein said polymer grafted to said rubber has a number average molecular weight greater than about 20,000 daltons, and is relatively free of crosslinks.

11. A modified rubber composition for reinforcing polyacrylate products by adding it to acrylate or polyacrylate comprising, apart from solvent, by weight percent
    A) up to 60% of a highly saturated rubber having less than 1% carbon-carbon double bonds in its main chain and more than 0.1% carbon-carbon double bonds in its side chain; and B) about 8 to 28% of an acrylate or mixture of acrylate monomer units of the structure $$CH_2 = \overset{R^1}{\underset{|}{C}} - CO_2R^2$$

where $R^1$ is selected from the group consisting of H and an alkyl group, and $R^2$ is selected from the group consisting of an alkyl group, said groups each comprising less than about 9 carbon atoms; in which greater than about 35% of said monomer units are present in the form of polymer chains grafted to said rubber; and wherein at least 85% of the homopolymers and copolymers of said acrylate monomer units have a $T_g$ between 50°–170° C.

12. The composition defined in claim 11 wherein said polymer chains have a number average molecular weight between about 10,000 to 80,000 daltons.

13. The composition defined in claim 11 wherein said molecular weight is greater than about 20,000 daltons.

* * * * *